(12) United States Patent
Mulye et al.

(10) Patent No.: US 11,836,689 B2
(45) Date of Patent: Dec. 5, 2023

(54) SYSTEMS AND METHODS FOR MONITORING CONTENT CONSUMPTION

(71) Applicant: Comcast Cable Communications, LLC, Philadelphia, PA (US)

(72) Inventors: Abhijeet Vijay Mulye, San Francisco, CA (US); Bernard Burg, Menlo Park, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 31 days.

(21) Appl. No.: 17/660,583

(22) Filed: Apr. 25, 2022

(65) Prior Publication Data

US 2022/0245603 A1    Aug. 4, 2022

Related U.S. Application Data

(63) Continuation of application No. 15/979,773, filed on May 15, 2018, now Pat. No. 11,341,467.

(51) Int. Cl.
*G06Q 20/06* (2012.01)
*H04L 9/06* (2006.01)
*H04N 21/442* (2011.01)

(52) U.S. Cl.
CPC ......... *G06Q 20/065* (2013.01); *H04L 9/0637* (2013.01); *H04N 21/44222* (2013.01)

(58) Field of Classification Search
CPC . G06Q 20/065; H04L 9/0637; H04L 2209/60; H04L 9/3226; H04L 2209/56; H04L 9/3239; H04L 9/3247; H04L 9/3297; H04L 9/50; H04N 21/44222; H04N 21/44204; H04N 21/251; H04N 21/25866; H04N 21/2407

USPC ............................................................. 705/39
See application file for complete search history.

(56) References Cited

U.S. PATENT DOCUMENTS

| | | | |
|---|---|---|---|
| 7,949,565 B1* | 5/2011 | Eldering et al. ....... | G06Q 30/00 705/14.49 |
| 10,121,025 B1* | 11/2018 | Rice ........................ | H04L 29/06 |
| 2007/0130070 A1* | 6/2007 | Williams ............... | G06Q 99/00 705/50 |
| 2015/0026706 A1 | 1/2015 | Eamon et al. | |
| 2015/0113547 A1 | 4/2015 | Wolf et al. | |
| 2015/0245084 A1* | 8/2015 | Downing et al. ... | H04N 21/2668 |
| 2015/0382057 A1* | 10/2015 | Huang et al. ......... | H04N 21/442 |
| 2017/0116693 A1* | 4/2017 | Rae et al. ............. | H04L 9/3247 |

(Continued)

OTHER PUBLICATIONS

Blockchain @ Media, A New Game Changer for the Media Industry, Blockchain Institute, Monitor, Deloitte, 2017. (Year: 2017).*

(Continued)

*Primary Examiner* — Scott C Anderson
*Assistant Examiner* — George N. Proios
(74) *Attorney, Agent, or Firm* — BakerHostetler

(57) ABSTRACT

Systems and methods are described for monitoring content consumption. A method may comprise determining, by a device, content accessed by one or more user devices. The method may comprise causing a distributed ledger record to be generated. The distributed ledger record may comprise an indication of the content. The distributed ledger record may be stored on a distributed ledger. The distributed ledger may comprise other records indicating content accessed by a plurality of other devices.

20 Claims, 12 Drawing Sheets

(56) References Cited

U.S. PATENT DOCUMENTS

| | | |
|---|---|---|
| 2017/0195747 A1 | 7/2017 | Haberman et al. |
| 2019/0058917 A1* | 2/2019 | Orlowski ............. H04N 21/442 |
| 2019/0213048 A1* | 7/2019 | Mason ................. H04L 67/025 |
| 2019/0268147 A1* | 8/2019 | Baird, III ............. H04L 9/0866 |

OTHER PUBLICATIONS

Wolfie Christl, Corporate Surveillance in Everyday Life, Cracked Labs, Vienna, Jun. 2017 . . . (Year: 2017).*

Amanda Newby, The Benefits of Monitoring & Analyzing Your Marketing Channels, Converge, Marketing Reporting Automation for Agencies and Brands, Jun. 2, 2016; (Year: 2016).*

Crosby et al., BlockChain Technology Beyond Bitcoin, Oct. 16, 2015, Sutardja Cenetr for Entrepeneurship & Technology Technical Report, Berkeley, University of California. (Year: 2015).*

Crosby et al., "BlockChain Technology Beyond Bitcoin", Sutardja Center for Entrepreneurship & Technology Technical Report, Oct. 16, 2015, 35 Pages.

Blockchain @ Media, A New Game for the Media Industry, Blockchain Institute, Monitor, Deloitte, 2017. (Year: 2017).

US Patent Application filed on Apr. 25, 2022, entitled "Systems and Methods for Monitoring Content Consumption", U.S. Appl. No. 17/660,571.

* cited by examiner

SYSTEMS AND METHODS FOR MONITORING CONTENT CONSUMPTION

CROSS REFERENCE TO RELATED APPLICATIONS

This application is a continuation of U.S. patent application Ser. No. 15/979,773, filed May 15, 2018, which is hereby incorporated by reference in its entirety.

BACKGROUND

Entities interested in monitoring content consumption may deploy a piece of physical hardware in people's homes and may ask every member of a respective household to click an activate button before watching television. Consumption ratings may be calculated based on statistical extrapolation. Such methods are expensive, as participants may be paid in exchange for monitoring their behavior and special hardware may need to be deployed. Such methods are also unreliable, as the methods may rely on participants to perform an action to capture their content consumption behavior. Additionally, statistical extrapolation may mean that monitored households disproportionately influence monitored results, for example, a single household switching channels may cause an impact equivalent to two thousand other households switching channels. These and other shortcomings may be addressed by the present disclosure.

SUMMARY

Systems and methods are described for monitoring content consumption. An example method may comprise determining, by a device, content accessed by one or more user devices. The example method may comprise causing a distributed ledger record to be generated. The distributed ledger record may comprise an indication of the content. The example method may comprise causing the distributed ledger record to be stored on a distributed ledger. The distributed ledger may comprise other records indicating content accessed by a plurality of other devices.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
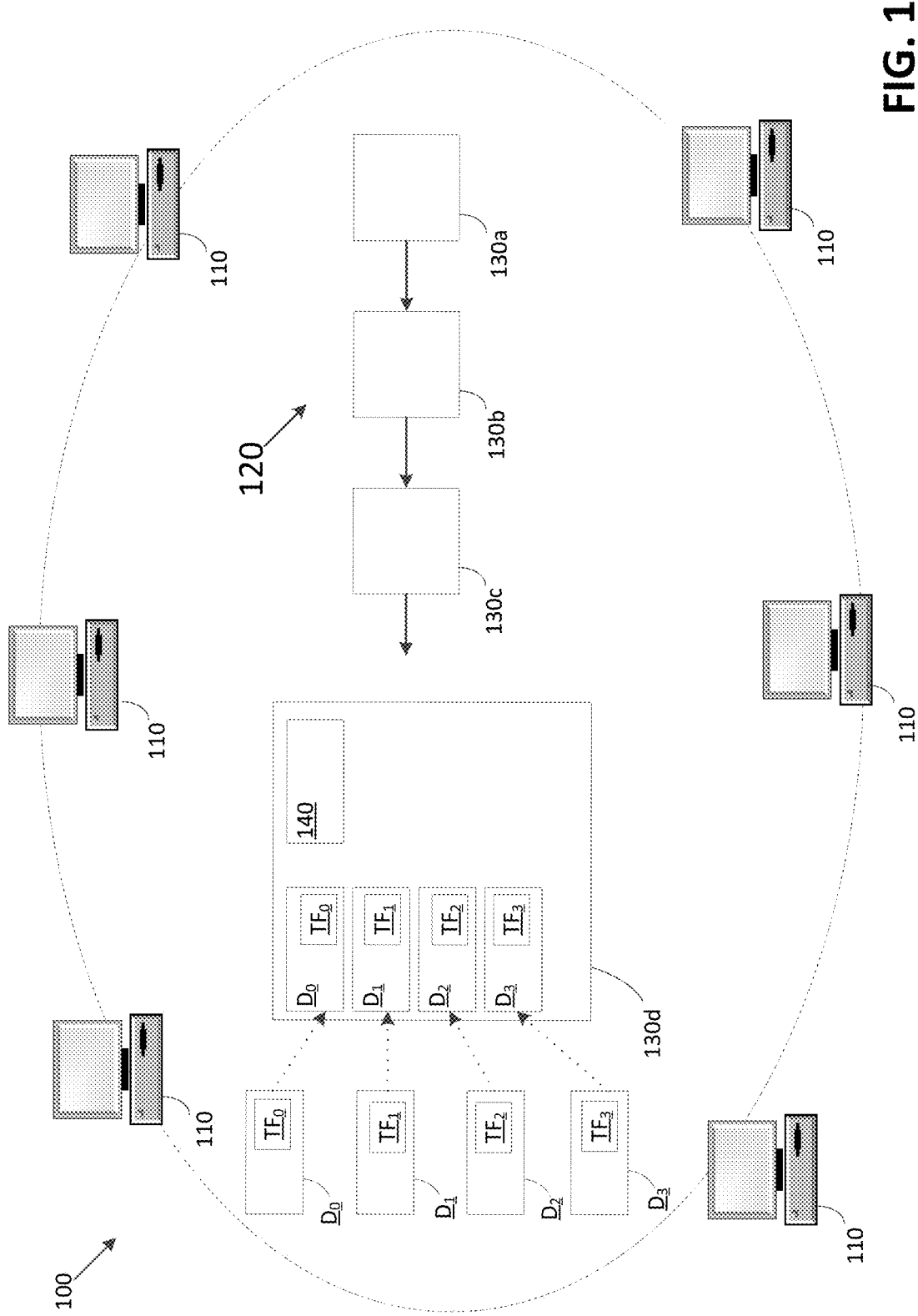
FIG. 1 shows an example distributed system architecture.

There exists a need for a system and/or method for monitoring content consumption (e.g., measuring television viewership, etc.) that does not require action to be taken from participants to monitor their content consumption and does not require significant investment in hardware. Systems and methods are described herein for monitoring content consumption. The systems and/or methods may comprise a plurality of computing devices (e.g., set-top boxes, modems, routers, etc.) arranged in a communication network. The communication network may deliver content (e.g., television shows, movies, commercials, etc.) to a portion of the plurality of computing devices. The portion of the plurality of computing devices may comprise one or more of the plurality of computing devices. The portion of the plurality of computing devices may comprise all of the plurality of computing devices. A public blockchain may run (e.g., execute, etc.) on the portion of the plurality of computing device. Some applications, such as data collection applications, storage applications, authentication application, etc., may be shifted to a virtual machine running on top of the blockchain. In particular, applications that are reliable, low-cost, and/or transparent in nature may be well suited to be shifted to a virtual machine running on top of the blockchain. The virtual machine may comprise a module configured to read and execute a blockchain protocol.

When one of the portion of the plurality of computing devices (an "engaged device") is engaged in a viewing event, the engaged device may create a record of the viewing event. A viewing event may comprise a show watched, a commercial watched, a channel watched, a watch duration, a watch percentage (e.g., how much of a program was watched, etc.), a channel changed, a volume changed, a request to record content, a request to view previously recorded content, a request for stored content (such as a request from a video on demand server), the like, and/or any combination of the foregoing. One or more of the viewing events, such as the watch percentage, for example, may be determined by comparing actual viewing against a preset schedule.

The record of the viewing event may be added into a ledger associated with the blockchain. The systems and/or methods may generate one or more units or partial units of a cryptocurrency or other value stored platform and provide the one or more units or partial units to one or more of the portion of the plurality of computing devices (one or more verifying devices) which perform operations to verify that the record of the viewing event should be added to the ledger. The engaged device may transfer one or more units or partial units of the cryptocurrency or other value stored platform to the one or more verifying devices. One or more units or partial units of the cryptocurrency or other value stored platform may be delivered to the engaged device to incentivize one or more users of the engaged device to consume more programs. One or more units or partial units of the cryptocurrency or other value stored platform may be offered to the engaged device in exchange for consuming a particular program.

Each of the portion of the plurality of computing devices may have access to or store a copy of the ledger. After the one or more verifying devices verify the record of the viewing event, the ledger of each of the portion of the plurality of computing devices may be updated, eventually, to include the record of the viewing event. If one of the portion of the plurality of computing device (a "node") has an up-to-date ledger for a particular program that aired, then the node may calculate consumption ratings associated with the program based on entries in the ledger and provide (e.g., publish, etc.) the calculated consumption ratings to a user, such as a service provider or a content distributor.

Each record in the ledger may be anonymous to other devices or anonymous to the public. Each record may comprise an identification which is known only to the user and/or a provider of the systems and/or methods. The identification may comprise numbers, letters, characters, symbols, etc. The identification may identify a user, a device, a household, an account, a customer, a company, an enterprise, etc. The identification may link demographic information (e.g., age, gender, race, national origin, marital status, religion, pet ownership status, etc.) about a user. The linked demographic information may be known for the user. The linked demographic information may be inferred (e.g., estimated, guessed, etc.) for the user based on observed behavior such as observed content consumption. Inferred demographic information may be in the form of a range (e.g., an age range, etc.). The public may be able to view records associated with an identification without obtaining the identity belonging to the identification.

If the portion of the plurality of computing devices is large enough, then extreme statistical extrapolation may not be needed. For example, if all of the plurality of computing device are in the portion of the plurality of computing devices, then no statistical extrapolation may be needed.

The systems and/or methods described herein provide a number of advantages. For example, content consumption information in the ledger may be valuable information for advertisers. Content consumption information in the ledger may provide valuable information for matching advertisements with programs to reach a target demographic. Content consumption information may be used to determine a programming schedule (e.g., which programs should be renewed for another season, which programs should be canceled, which programs should be moved to a new time slot, which new programs should be picked up, etc.).

The systems and/or methods described herein may comprise a security system. The security system may comprise information related to presence on a premises. For example, the security system may be armed in a first mode of operation (e.g., detect any movement inside, etc.) if no one is on a premises, and the security system may be armed in a second mode of operation (e.g., detect a breach in any entry way, etc.) if someone is on the premises. The security system may comprise information related to who is currently on a premises. For example, detection of a device identifier (such as detecting a Bluetooth address attached to a wireless fidelity ("Wi-Fi") computing device associated with the premises, etc.) may indicate presence of a related device (such as a smart phone, etc.) on the premises, which, in turn, may indicate presence of a related user. As another example, the security system may infer (e.g., estimate, guess, etc.) who is on the premises based on analyzing time-series patterns of connecting and disconnecting to one or more Wi-Fi computing devices associated with the premises. Detecting or guessing who is on the premises may be used to determine demographics of viewers on the premises. Custom advertisements may be delivered to the premises based on the determined demographics. Custom advertisements may be delivered to the premises based on the detected or inferred users on the premises.

FIG. 1 shows an example distributed system. The distributed system may comprise a network 100 of nodes 110. A node 110 may comprise a computing device, a central processing unit, a graphical processing unit, a field programmable gate array, or an application specific integrated circuit. A node 110 may comprise a content distribution device, such as a cable modem, set-top box, lap top, smart phone, tablet, wearable computing device, mobile computing device, or any computing device in communication with a content distribution network.

The network 100 of nodes 110 may comprise a decentralized database. The decentralized database may not have a central administrator or centralized storage. For example, each node 110 in the network 100 may store a copy of a collection of data, such as a distributed ledger. A distributed ledger may comprise recorded entries, such as transactions. The data may be replicated, shared, or synchronized across the nodes 110. The decentralized database may be continually reconciled, such as to reflect changes to the collection of data. The nodes 110 may continually or periodically download the most recent version of the collection of data. When a node 110 joins the network 100, the node 110 may automatically download the collection of data.

A decentralized database, such as a distributed ledger, may comprise a blockchain 120. The decentralized database, such as the distributed ledger, may comprise a blockchain database and/or utilize blockchain data management techniques. A blockchain 120 may comprise one or more blocks 130 in which data is recorded. The blocks 130 in the blockchain 120 may be function as a mechanism to organize the data in the blockchain 120. For example, the blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may perform several operations to build the blockchain 120. For example, when new data $D_0$, $D_1$, $D_2$, $D_3$ is received by the network 100, the nodes 110 may validate the new data $D_0$, $D_1$, $D_2$, $D_3$. As an example, if the new data $D_0$, $D_1$, $D_2$, $D_3$ comprises transactions, the nodes 110 may validate, verify, or authenticate the identity of the parties to the transaction. The one or more transactions will be discussed in more detail in reference to FIGS. 4 & 5 below. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature with the public key. The digital signature may allow for verification of the transaction while maintaining the anonymity of the parties to the transaction.

The nodes 110 may collate the new data $D_0$, $D_1$, $D_2$, $D_3$ into a new block 130d. The nodes 110 may record one data entry $D_0$ in a new block 130d. The nodes 110 may perform an operation to add the new block 130d to the blockchain 120. For example, if the data in the blocks 130 is related chronologically, such as where the first block 130a in the blockchain records older data than the data of subsequent blocks 130b, 130c, the nodes 110 may perform a timestamp function to log the sequence in which blocks 130 are added to the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

The nodes 110 may be incentivized to perform the operation to add a new block 130d to the blockchain 120. For example, a block 130d may be assigned a value 140, such as a coin or unit of digital currency that will be transferred to one or more nodes 110 that perform part or all of the operation. A digital currency may comprise a cryptocurrency, such as Bitcoin, Litecoin, TorCoin, Ethereum, etc. The value 140 may depend on the difficulty of performing the operation for the block 130d. Also, if the data $D_0$, $D_1$, $D_2$, $D_3$ recorded in a block 130d comprises transactions, a transaction may assign a transaction fee $TF_0$, $TF_1$, $TF_2$, $TF_3$ which may be transferred to one or more nodes 110 that perform the operation on the block 130d in which the transaction is recorded. If an incentive is provided for nodes 110 to perform the operation to add the new block 130d to the blockchain 120, performance of the operation may be referred to as mining. Mining may comprise creating one or more new units or partial units of the cryptocurrency or other value stored platform and distributing the one or more new units or partial units to the nodes 110 engaged in mining. The one or more new units or partial units of the cryptocurrency or other value stored platform may be created at a predetermined interval. The one or more new units or partial units of the cryptocurrency or other value stored platform may be assigned randomly (e.g., as in a lottery, etc.) to nodes 110 engaged in mining. Cryptocurrency or other value stored platform may be used as a gauge for productive and/or reliability (or proof of stake) among the nodes 110. For example, in an embodiment, a validated transaction may not be added to a block 130a, 130b, 130c, 130d if a proof of work (e.g., the computing power used to find a nonce to hash with the block 130a, 130b, 130c, 130d) associated with the transaction is at and/or above a threshold number of digits. Before a transaction is added to a block 130a, 130b, 130c, 130d, the nodes 110 may vote on adding the transaction. Each nodes' 110 vote may be weighted by a respective value of cryptocurrency or other value stored platform comprised by the respective node 110.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. For example, incentives may be divided proportionally to contribution of the nodes 110 to the work.

Once the operation is performed to add a new block 130d to the blockchain 120, the nodes 110 may communicate the new block 130d to the network 100. The nodes 110 may express their acceptance of the new block 130d to the blockchain 120 by working off the block 130d when performing the operation to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. For example, a blockchain 120 may be assigned a score based on the computational work required to create the blockchain 120. A node 110 may communicate the longest blockchain 120 that the node 110 has observed to the network 100, such as with a gossip protocol.

The network 100 may have self-correcting mechanisms, such as to address discrepancies between nodes 110 in the network 100. For example, if there is a fork in a blockchain 120, a node 110 working off one branch of the blockchain 120 may switch to a second branch of the blockchain 120, if the second branch becomes longer than the first branch. As another example, if a node 110 does not receive a block 130b, the node 110 may request the block 130b when the node 110 receives the next block 130c and determines that the node 110 did not receive the previous block 130b.

One or more nodes 110 in the network 100 may not participate in building the blockchain 120. The operations that the nodes 110 in the network 100 may perform relating to the blockchain may not be limited to building the blockchain 120. As an example, one or more nodes 110 may monitor the blockchain 120 for particular transactions. For example, the nodes 110 may monitor the blockchain 120 for transactions that comprise an identifier associated with a party.

Figure 2:
FIG. 2 shows an example blockchain architecture.

FIG. 2 shows an example distributed ledger architecture. A distributed ledger may comprise a blockchain 200 in which one or more transactions are recorded in blocks 210, 220, 230. The one or more transactions will be discussed in more detail in reference to FIGS. 4 & 5 below. The distributed ledger may comprise a blockchain database and/or utilize blockchain data management techniques. The blocks 210, 220, 230 may be linked in a sequence that represents the chronology of the execution, validation, or recording of the transactions. For example, the blockchain 200 may comprise a genesis block 210 that records the earliest transaction in the blockchain 200 and comprises the first block 210 in the blockchain 200. Each block 220, 230 following the genesis block 210 may record a transaction that was executed or validated subsequent to the transaction of the preceding block 210, 220, 230 in the blockchain 200. Each block 210, 220, 230 may record a transaction that occurred prior to the transaction of the subsequent block 220, 230 in the blockchain 200. To illustrate, the block 230 may record a transaction that occurred after the transaction recorded in the block 220. A new transaction may be recorded in a new block. The new block may be appended to the last block 230 in the blockchain 200. Although the example blockchain 200 is depicted as comprising three blocks 210, 220, 230, the blockchain 200 may comprise less than three blocks or more than three blocks. The blocks 210, 220, 230 may record transactions as hashes of the transactions.

The blocks 210, 220, 230 may function as a mechanism to implement a timestamp server to generate computational proof of the chronological order of the transactions in the blockchain 200. A timestamp of a block 210, 220, 230 may comprise a hash of the transaction in the block 210, 220, 230 and the transaction of the previous block 210, 220, 230 in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that when cryptographically hashed with the hash of the transaction of a block ($H_{Transaction}$) and the hash of the transaction of the previous block yields a hash ($H_{Block}$) with a pre-determined number of leading zero bits. For example, a proof ($Proof_{210}$, $Proof_{220}$, $Proof_{230}$) may be identified such that the hash ($H_{Block}$) has 60 leading bits that are zero.

To illustrate, a proof-of-work for the block 220 may comprise scanning for a proof ($Proof_{220}$) that when hashed with the transaction of the block 220 ($H_{Transaction220}$) and the hash of the previous block 210 ($H_{Block210}$) yields an output ($H_{Block220}$) that has a pre-determined number of leading zero bits. The proof-of-work may be solved for a hash function in which a hash of the transaction ($H_{Transaction}$) is an input of the hash function. The next block 230 in the blockchain 200 will be appended to the blockchain 200 when a proof-of-work is performed to identify a proof ($Proof_{230}$) which hashed with the transaction of the block 230 (or hash of the transaction $H_{Transaction230}$) and the hash of the block 220 ($H_{Block220}$) yields an output ($H_{Block230}$) with a pre-determined number of leading zero bits. Once the proof ($Proof_{230}$) is identified, the block 230 may be broadcast through the network. If the block 230 is accepted, the nodes may work on creating the next block in the blockchain 200 using the hash ($H_{Block230}$) of the accepted block 230.

An iterative proof-of-work protocol may deter modification of a block in the blockchain 200 as it would require re-doing the proof-of-work for each proceeding block in the blockchain 200. For example, modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the blockchain 200 may require a new proof-of-work.

Figure 3:
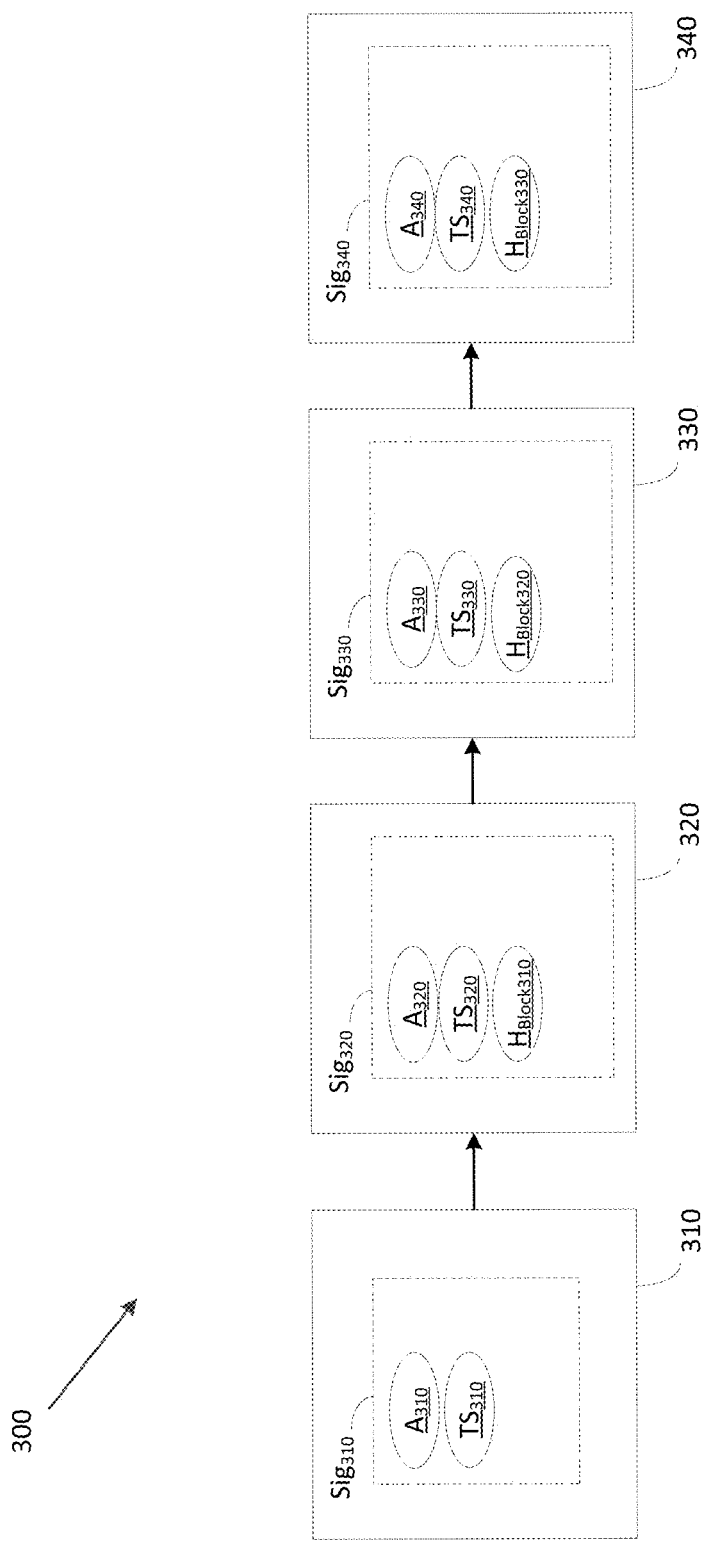
FIG. 3 shows an example distributed ledger architecture.

FIG. 3 shows an example system for monitoring content consumption. The system may comprise a distributed ledger 300. The distributed ledger 300 may comprise a blockchain. The distributed ledger 300 may comprise a database of content consumption records. The content consumption records may comprise records of content consumed on one or more devices. The devices may comprise devices associated with a common entity such as a service provider or a content distributor for example. The devices may comprise computing devices, electronic devices, mobile devices, or any device configured to deliver content to a user for consumption (a content consumption device). A content consumption device may comprise a device embedded with electronics, such as a circuitry part, a sensor, a camera, an audio input or output, or a lighting unit. A content consumption device may have computing capabilities. A content consumption device may have network connectivity capabilities. A content consumption device may have capabilities (e.g., or may be configured) to collect and exchange data. As an example, a content consumption device may comprise a personal computer, a mobile phone, a household appliance, a wearable, a gateway device, a premises management system component, a content device, a display, and a vehicle.

The distributed ledger 300 may comprise a plurality of blocks 310, 320, 330, 340. Each block 310, 320, 330, 340 may comprise a distributed ledger entry. The distributed ledger entry may comprise a record of content consumption. The record of content consumption may comprise data identifying a device by which the content was consumed. For example, each block 310, 320, 330, 340 may comprise a hash of a key of the device. The key may comprise a public key of the device. The public key may be unique to the device. The public key may be paired with a private key of the device. Each block 310, 320, 330, 340 may comprise an address of the device ($A_{310}$, $A_{320}$, $A_{330}$, $A_{340}$). The address may comprise a hash of the key of the device, such as the public key of the device.

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate when the block 310, 320, 330, 340 was created. The inclusion of the timestamps ($TS_{310}$, $TS_{320}$, $TS_{330}$, $TS_{340}$) may link the blocks 310, 320, 330, 340. Each block created after a genesis block 320, 330, 340 may comprise a hash ($H_{Block310}$, $H_{Block320}$, $H_{Block330}$) of the previous block ($H_{Block310}$, $H_{Block320}$, $H_{Block330}$) in the distributed ledger 300. The inclusion of the hash of the previous block ($H_{Block310}$, $H_{Block320}$, $H_{Block330}$) in the distributed ledger 300 may link the blocks 310, 320, 330, 340. The inclusion of the hash of the previous blocks ($H_{Block310}$, $H_{Block320}$, $H_{Block330}$) in the distributed ledger 300 may comprise an iterative chain of hash functions. The linking of the blocks 310, 320, 330, 340 may deter unauthorized tampering or breaching of the distributed ledger 300. For example, tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of the device, such as the private key of the device. The signature ($Sig_{310}$, $Sig_{320}$, $Sig_{330}$, $Sig_{340}$) may comprise an encryption of one or more of the address of the device ($A_{310}$, $A_{320}$, $A_{330}$, $A_{340}$), the hash of the key, the timestamp ($TS_{310}$, $TS_{320}$, $TS_{330}$, $TS_{340}$) and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed ledger 300. The private key used to sign may be necessary to create or retroactively modify a block or entry of the distributed ledger 300. Only the device or entity with the private key may alter or add to the distributed ledger 300. The device or the entity may comprise an administrator of the distributed ledger 300.

The distributed ledger 300 may comprise a genesis block 310. The genesis block 310 may comprise the first block of the distributed ledger 300. The genesis block 310 may comprise the oldest block or the first block created of the distributed ledger 300. The genesis block 310 may be associated with a device, such as a computing device. The computing device may be associated with a service provider or a content distributor. For example, the computing device may comprise a server associated with the service provider or content distributor. The genesis block 310 may comprise data identifying the computing device. The computing device may create the genesis block 310. The computing device may create the distributed ledger entry of the genesis block 310. The computing device may transmit the distributed ledger entry to the distributed ledger 300 or to a network. The computing device may record the distributed ledger entry in the genesis block 310. The computing device may create the distributed ledger 300. The computing device may create the subsequent blocks 320, 330, 340 of the distributed ledger 300. The computing device may create the distributed ledger entries of the subsequent blocks 320, 330, 340. The computing device may transmit the distributed ledger entries of the subsequent blocks 320, 330, 340 to the distributed ledger 300 or to a network.

The distributed ledger 300 may comprise a component of a distributed ledger. The distributed ledger 300 may comprise a branch of another blockchain, such as a general blockchain. The general blockchain may comprise a plurality of branches. Each of the plurality of branches may comprise a blockchain or another plurality of blockchains. The general blockchain may comprise a plurality of blockchains. Each of the plurality of blockchains may comprise a register of associated devices. Each of the plurality of blockchains may be associated with a common entity, such as a content distributor or a service provider. The general blockchain may comprise a database of records of content consumption associated with an entity and each of the plurality of blockchains may comprise a database of records of content consumption associated with a sub-entity of the entity. As an illustrative example, the general blockchain may be associated with a service provider. Each of the plurality of blockchains may comprise a register of devices associated with a customer of the service provider.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise associated devices. For example, the nodes may comprise devices associated with the blocks 310, 320, 330, 340 of the distributed ledger 300. The nodes may comprise devices identified by the data in the blocks 310, 320, 330, 340 of the distributed ledger 300.

The distributed ledger 300 may be updated. Updating the distributed ledger 300 may comprise creating a distributed ledger entry. Updating the distributed ledger 300 may comprise transmitting a distributed ledger entry to the distributed ledger 300 or a network. Updating the blockchain may comprise recording the distributed ledger entry in a block 310, 320, 330, 340 of the distributed ledger 300. Updating the blockchain may comprise creating a block 310, 320, 330, 340 of the distributed ledger 300.

The distributed ledger 300 may be updated by a computing device or. The distributed ledger 300 may be updated by a computing device associated with the distributed ledger 300, such as a computing device identified by data in a block 310, 320, 330, 340 of the distributed ledger 300. The blockchain may be updated by a computing device associated with an entity associated with the blockchain. The distributed ledger 300 may be updated by a device comprising software to access the distributed ledger 300.

The software may comprise an application or custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The distributed ledger 300 may be updated by a user. Alternatively, the distributed ledger 300 or a system may be configured such that a user has limited access to the distributed ledger 300. For example, the distributed ledger 300 or the system may be configured such that a user may not update the distributed ledger 300 or may not directly update the distributed ledger 300.

Updating the distributed ledger 300 may comprise creating a distributed ledger entry, such as using the custom software library. Updating the distributed ledger 300 may comprise transmitting the distributed ledger entry to the distributed ledger 300 or a network. Updating the distributed ledger 300 may comprise recording the distributed ledger entry in a new block of the distributed ledger 300. Updating the distributed ledger 300 may comprise creating a new block. Updating the distributed ledger 300 may comprise transmitting a new block to the distributed ledger 300 or a network. Updating the distributed ledger 300 may comprise performing underlying blockchain integration, such as validating a new block or performing a proof to add a new block to the blockchain. Validating the block may comprise determining that the entry is signed by an authorized device or an associated device.

Figure 4:
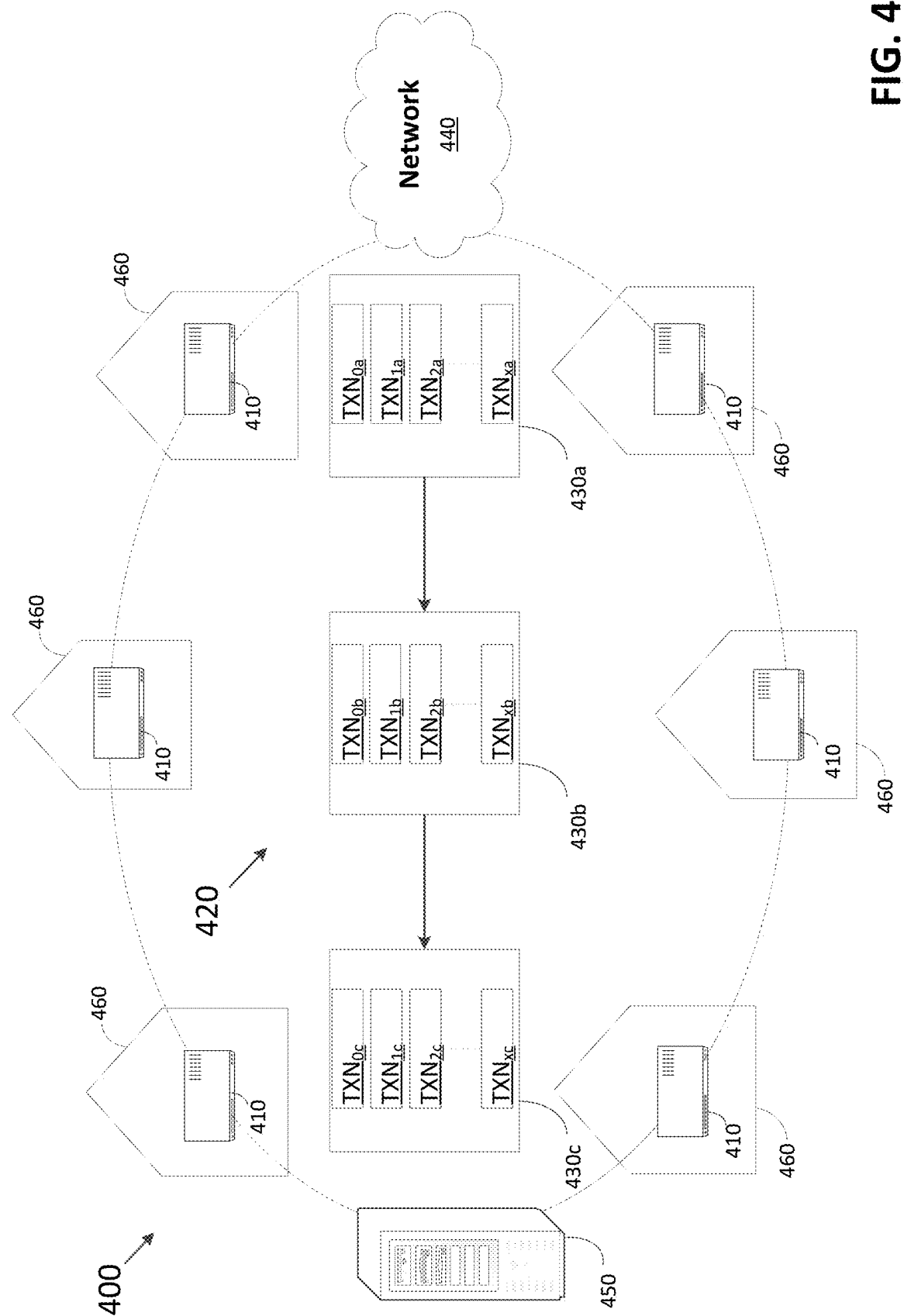
FIG. 4 shows an example content consumption monitoring system.

FIG. 4 shows an example content consumption monitoring system 400. The content consumption monitoring system 400 may comprise one or more user devices 410. The one or more user devices 410 may comprise a content distribution device, such as a cable modem, set-top box, lap top, smart phone, tablet, wearable computing device, mobile computing device, or any computing device in communication with a content distribution network. The one or more user devices 410 may receive content from a network 440. The network 440 may comprise a content distribution network, such as a cable network, a broadband network, a satellite network, a cellular network, etc.

The one or more user devices 410 may cause content received from the network 440 to be presented (e.g., displayed, projected, broadcast, etc.) to a user at one or more respective premises 460. The one or more premises 460 may be arranged into a neighborhood. A network server 450 may be associated with the neighborhood. A neighborhood may comprise an actual physical neighborhood. A neighborhood may be used to describe any premises 460 served by a common network server 450, regardless of their physical location.

The network server 450 may receive viewing data from the one or more user devices 410 in the neighborhood. Viewing data may comprise a show watched, a commercial watched, a channel watched, a watch duration, a watch percentage (e.g., how much of a program was watched, etc.), a channel changed, a volume changed, a request to record content, a request to view previously recorded content, a request for stored content (such as a request from a video on demand server), the like, and/or any combination of the foregoing. The one or more user devices 410 and/or the network server 450 may derive viewing data, such as the watch percentage, for example, by comparing actual viewing against a preset schedule. The network server 450 may generate transaction records, which will be described in greater detail in reference to FIG. 5, based on the received viewing data.

One or more of the network server 450 and the user devices 410 may generate a transaction record (TXN). The transaction record may comprise an indication of the viewing data. The transaction record may be configured for a blockchain 420. The blockchain 420 may be similar to any of distributed ledgers 120 in FIG. 1, 200 in FIG. 2, and 300 in FIG. 3. The user devices 410 may function as nodes of the blockchain 420. The user devices 410 and the network server 450 may store a copy of the blockchain 420. The user devices 410 and the network server 450 may build the blockchain 420 by validating the transaction record and recording the transaction record on the blockchain 420 (e.g., "mining," "forging", etc.). The user devices 410 and the network server 450 may comprise modules configured to read and execute a transaction protocol associated with the blockchain 420, such as Ethereum virtual machines. Alternatively, a central node, such as a device associated with the service provider, may build the blockchain 420. Transaction records 500 may be recorded in blocks 430, which may be recorded on the blockchain 420.

One or more of the user devices 410 and the network server 450 may validate the transaction records. The transaction records may be validated based on whether the data of the transaction records contradicts data recorded on the blockchain 420. A transaction record may be validated based on whether the device that generated the transaction record is authorized to add data to the blockchain 420. The transaction record may be validated based whether the generating device is associated with a service provider account. One or more of the user devices 410 and the network server 450 may authenticate the generating device. For example, the generating device may be authenticated by performance of a handshake protocol. The handshake protocol may be performed before the transaction record is transmitted. At least a portion of the transaction record, such as a portion signed with the digital signature, may be decrypted using a public key. Successful decryption may indicate that the generating device is in possession of a private key associated with the public key. Possession of the private key may indicate that the generating device is associated with the public key. One or more of the user devices 410 and the network server 450 may determine that the generating device is authorized to add data to the blockchain 420 based on locating the public key or the entity identifier in a database of authorized devices. The blockchain 420 itself may comprise a record (e.g., transaction) that indicates devices authorized to add data to the blockchain.

Figure 5:
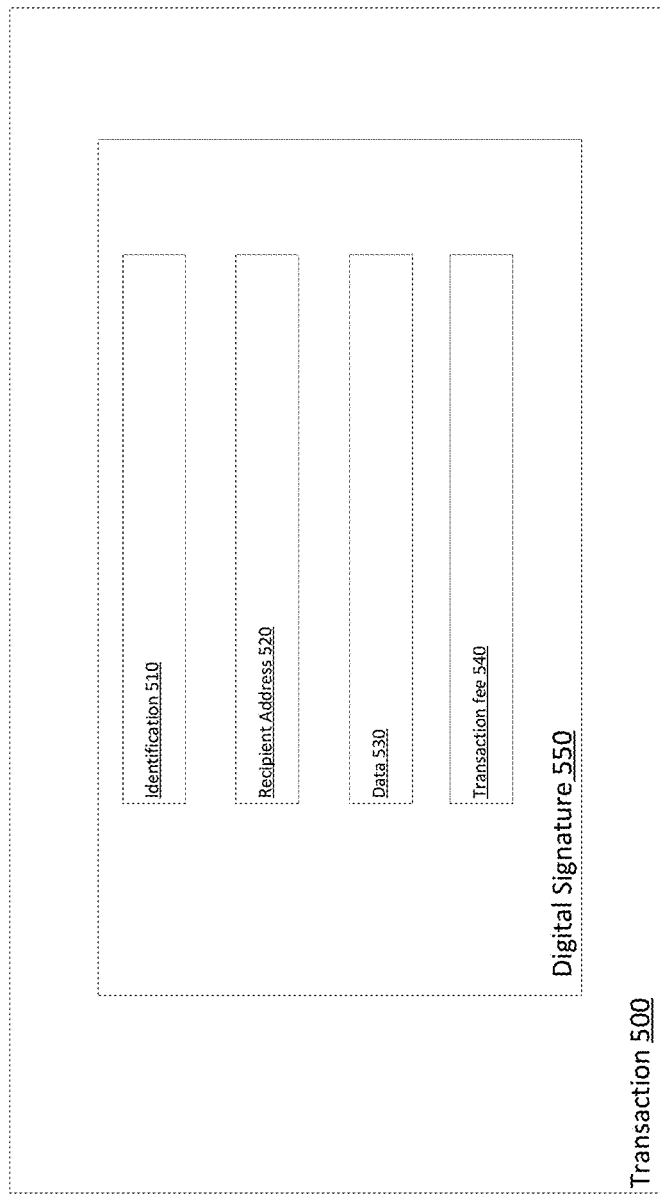
FIG. 5 shows an example structure for a transaction record.

FIG. 5 shows an example structure for a transaction record 500 (a "transaction"). The transaction record 500 may be like any of transactions in FIGS. 1-4. The transaction record 500 may comprise an identification (an "ID") 510. The ID 510 may be associated with a device. For example, the ID 510 may be associated with a user device 410 of FIG. 4. Each device may be assigned a unique ID 510 that is different from other ID's 510. For example, no two devices may be assigned the same ID 510. The ID 510 may be associated with a group of devices, such as devices that are associated with a common entity. The ID 510 may be associated with an account of a user, household, or other entity, such as a content subscription account. The ID 510 may be anonymous or private (e.g., it may not be publicly known what account the ID 510 is associated with). Anonymity or privacy may be desirable as transactions on a blockchain may be visible (at least to nodes of the blockchain), and it may be desirable to keep content consumption associated with an account private. The ID 510 may be encrypted. The ID 510 may be encrypted such that only a service provider may decrypt the ID 510. For example, the service provider may have a public key, which may be publicly known, and a private key, which may only be known to the service provider. The ID 510 may be encrypted using a public key of a service provider. The service provider may decrypt the ID 510 using the private key. The service provider may have access to a private table or database where entity keys are mapped to accounts, households, users, or other entities.

The transaction record 500 may comprise a recipient address 520. The recipient address 520 may comprise an address of a device associated with the service provider, such as a node of a blockchain associated with the service provider. For example, the recipient address 520 may be associated with a network server 450 of FIG. 4. As another example, the recipient address 520 may be associated with a backend server of a service provider.

The transaction record 500 may comprise data 530. The data may comprise content consumption data 530. For example, the data 530 may comprise content consumption data 530 associated with a user device 410 of FIG. 4. The data 530 may comprise content consumption data 530 associated with the device associated with the ID 510. The data 530 may comprise a channel. The data 530 may comprise a start time associated with viewing of the channel on the user device. The data 530 may comprise a stop time associated with the viewing of the channel on the user device. The stop time may comprise a time that the channel was switched or a time at which the user device was powered off, for example. The data 530 may also comprise a program or commercial that was viewed. The data 530 may comprise user actions, such as a switching of a channel, a powering off of the user device, or a reducing volume during a commercial.

The transaction record 500 may comprise a transaction fee 540. The transaction fee 540 may be a value. For example, the transaction fee 540 may indicate one or more units or partial units of a cryptocurrency. The transaction fee 540 may be associated with verification of the transaction record 500. The transaction fee 540 may be associated with adding the transaction record 500 to a block. For example, the transaction fee 540 may be paid from a user device 410 of FIG. 4 that generated the transaction record 500 to a network server 450 of FIG. 4 for verifying the transaction record 500 and/or adding the transaction record 500 to a block. The transaction fee 540 may be paid from the device associated with the ID 510. As another example, a node 110 of FIG. 1 that generated the transaction record 500 may pay the transaction fee 540 to another node 110 of FIG. 1 that verifies the transaction record 500 and/or adds the transaction record 500 to a block. As another example, a service provider may pay the transaction fee 540 to a network server 450 of FIG. 4 for verifying the transaction record 500 and/or adding the transaction record 500 to a block. As another example, a service provider may pay the transaction fee 540 to a node 110 of FIG. 1 for verifying the transaction record 500 of another node 110 of FIG. 1 or adding the transaction record 500 to a block. The transaction fees may be flat, so that all transactions may be equally likely to be verified and/or recorded on the blockchain.

The transaction record 500 may comprise a digital signature 550. Each device may have a private key and public key pair. For example, each node 110 of FIG. 1 may comprise a private key and public key pair for encrypting and decrypting messages among each other. As another example, each user device 410 of FIG. 4 may comprise a private key and public key pair for encrypting and decrypting messages with a network server 450 of FIG. 4. As another example, a network server 450 of FIG. 4 may comprise a private key and public key pair for encrypting and decrypting messages with user devices 410 of FIG. 4. The transaction record 500 or a portion of the transaction record 500 may be encrypted with the private key of the device. The digital signature may function to verify that the device generated the viewership data or the transaction record 500.

The transaction record 500 may comprise a language, such as bytecode, Solidity, Serpent, or another smart contract programming language. A user device may broadcast the transaction record 500 to the blockchain, such as by sending the transaction record 500 to other nodes of the blockchain. For example, a node 110 of FIG. 1 may broadcast the transaction record 500 to other nodes 110 of FIG. 1. Alternatively, each user device may transmit the indications of the channels watched and times to another device, such as a gateway device or a regional node (e.g., at a premises, region, or area). For example, user devices 410 of FIG. 4 may transmit the indications of channels watched and times to the network server 450 of FIG. 4. The other device may generate the transaction record 500 using the received data. For example, user devices that do not comprise sufficient computing or processing power to generate the transaction record 500 may send the data to other devices that have greater computing or processing power.

The user devices or the gateway/regional node may function as nodes of the blockchain. All of the user devices may store a copy of the blockchain. The user devices or the gateway/regional node may build on the blockchain by validating a transaction record 500 and recording a transaction record 500 on the blockchain (e.g., "mining," "forging", etc.). Each of the nodes may comprise modules configured to read and execute the transaction protocol, such as Ethereum virtual machines. Alternatively, a central node, such as a device associated with the service provider, may build the blockchain. Transaction records 500 may be recorded in blocks, which may be recorded on the blockchain.

One or more of the other nodes may validate the transaction record 500. The transaction record 500 may be validated based on whether the data of the transaction record 500 does not contradict data recorded on the blockchain. The transaction record 500 may be validated based on whether the node is authorized to add data to the blockchain. The transaction record 500 may be validated based whether the node is associated with a service provider account. One or more other devices may authenticate the node. For example, the node may be authenticated by performance of a handshake protocol. The handshake protocol may be performed before the transaction record 500 is transmitted. At least a portion of the transaction record 500, such as a portion signed with the digital signature, may be decrypted using a public key. Successful decryption may indicate that the node is in possession of a private key associated with the public key. Possession of the private key may indicate that the node is associated with the public key. The one or more other nodes may determine that the node is authorized to add data to the blockchain based on locating the public key or the entity identifier in a database of authorized devices. The blockchain itself may include a record (e.g., transaction) that indicates devices authorized to add data to the blockchain.

Figure 6:
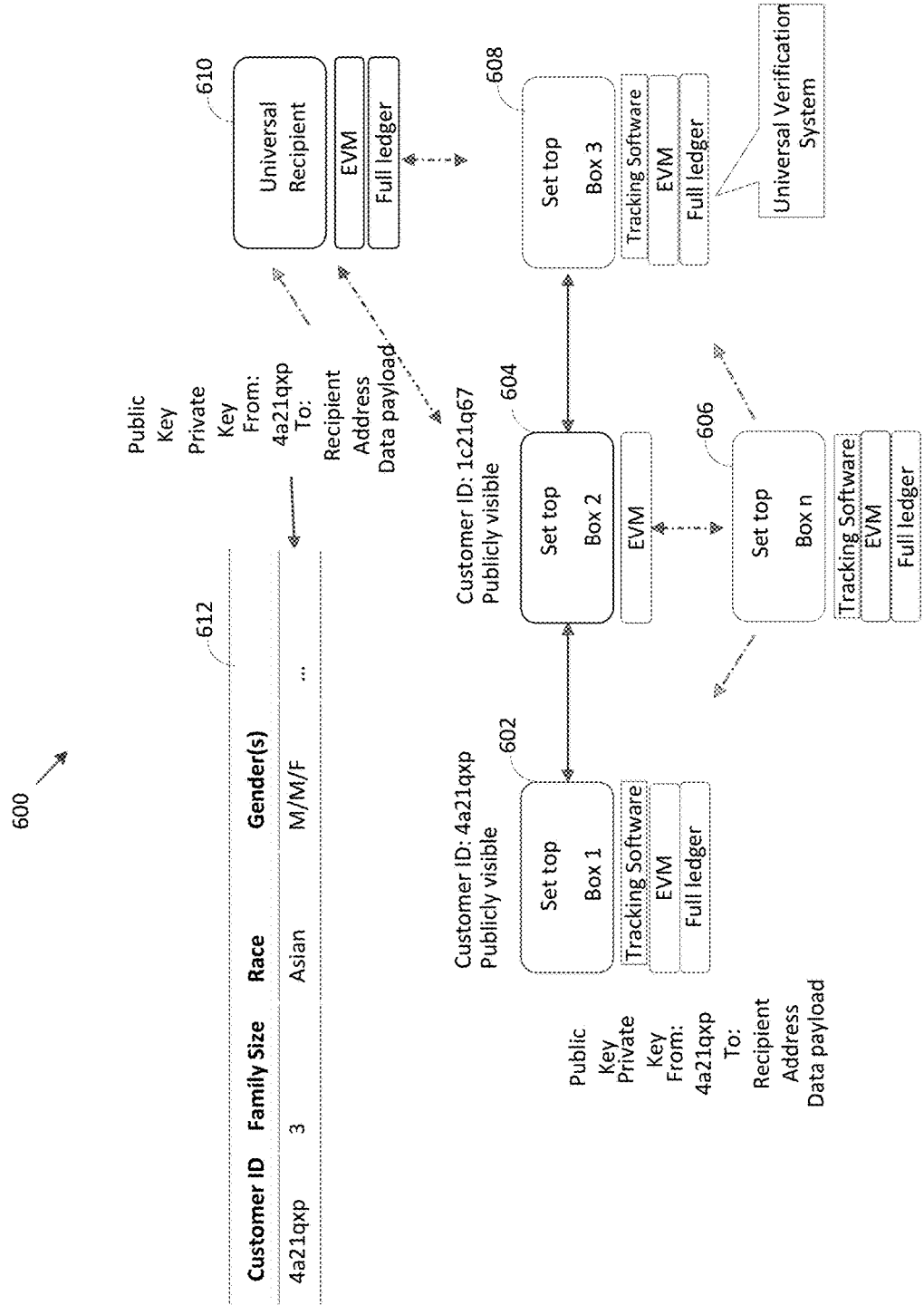
FIG. 6 shows an example content consumption monitoring system.

FIG. 6 shows an example content consumption monitoring system 600. The content consumption monitoring system 600 may comprise a plurality of content consumption devices 602, 604, 606, 608. The content consumption devices may comprise user devices, such as playback devices or set-top boxes. The system 600 may comprise a universal recipient 610. The universal recipient 610 may comprise a device associated with a service provider, such as a content distributor. The content consumption devices 602, 604, 606, 608 and the universal recipient 610 may have access to a distributed ledger. The content consumption devices 602, 604, 606, 608 may comprise customer identifiers (IDs). The customer IDs may be visible to all of the content consumption devices 602, 604, 606, 608. The content consumption devices 602, 604, 606, 608 may be associated with the service provider. A user associated with a content consumption device 602 may request a content asset (e.g., may tune the content consumption device 602 to a channel showing the content asset, may request the content asset from a video on-demand server, etc.). Back-end equipment associated with the service provider may deliver the content asset to the content consumption device 602. The content consumption device 602 may generate a record indicative of the content asset. The record may comprise an indication of the content asset, a time associated with consumption of the content asset via the content consumption device 602, a customer ID associated with the content consumption device 602, and an address associated with the universal recipient 610. The content consumption device 602 may encrypt the record with a private key. The content consumption device 602 may broadcast the record to the other content consumption devices 604, 606, 608.

Another content consumption device 604 may receive the record. The content consumption device 604 may decrypt the record using a public key associated with the content consumption device 602. The content consumption device 604 may verify the record by decrypting the record. The content consumption device 604 may update the distributed ledger with the record in response to verifying the record. The content consumption device 604 may broadcast the updated ledger to the other content consumption device 602, 606, 608, and the universal recipient 610.

The universal recipient 610 may retrieve the record from the distributed ledger. The universal recipient 610 may decrypt the record using a public key associated with the content consumption device 602. The system 600 may comprise a customer database 612. The customer database may comprise a record of the content consumption devices 602, 604, 606, 608. The customer database 612 may comprise a record of devices associated with the service provider or of devices associated with customers of the service provider. The universal recipient 610 may query the customer database 612 using the customer ID associated with the record. The universal recipient 610 may retrieve demographic information from entries in the customer database 612 associated with the customer ID. The universal recipient 610 may associate some or all of the demographic information with the content asset.

Figure 7:
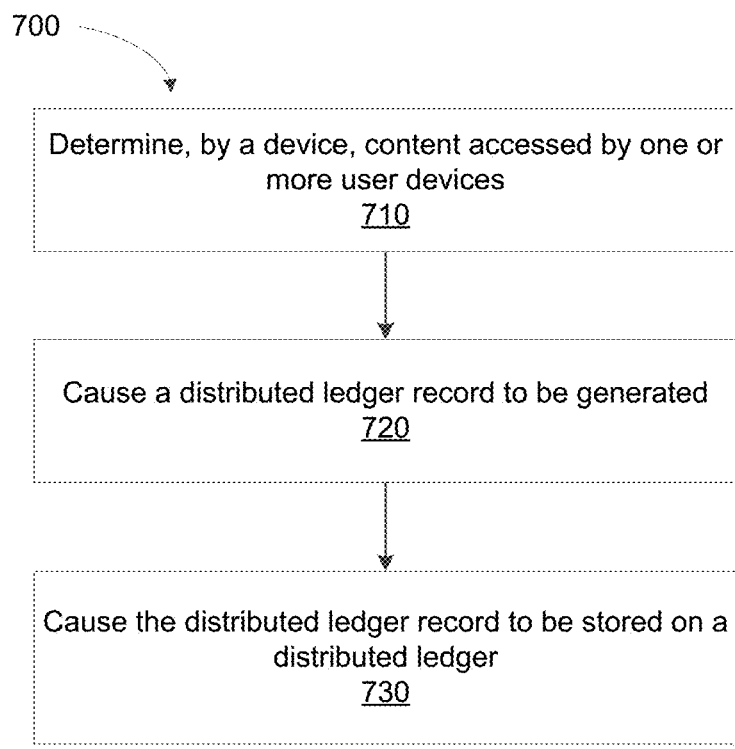
FIG. 7 shows a flow diagram of an example method.

FIG. 7 shows a method 700 for monitoring content consumption. At step 710, content accessed by one or more user devices may be determined by a device. For example, content accessed by a node 110 of FIG. 1 may be determined by a user device. As another example, content accessed by a user device 410 of FIG. 4 may be determined by a network server, such as network server 450 of FIG. 4. The determining the content accessed may comprise determining a time at which the content was accessed, such as by the one or more user devices. The determining the content accessed may comprise determining a content channel accessed by the one or more user devices. The determining the content accessed may comprise determining, based on a content schedule, content output on the content channel at the determined time. The content may comprise at least one of video content, audio content, or interactive content. The content may comprise at least one of pre-recorded content or live streaming content. The content may comprise at least one of a television program, a movie, music, an audiobook, a podcast, an electronic book, a game, a channel, or a commercial. The content may be associated with a content service provider.

At step 720, a distributed ledger record may be caused to be generated. For example, the user device may cause the distributed ledger record to be generated. As another example, the network server may cause the distributed ledger record to be generated. The distributed ledger record may comprise an indication of the content.

The causing the distributed ledger record to be generated may comprise generating, by the device, the distributed ledger record. The causing the distributed ledger record to be generated may comprise sending, to another device, data indicative of the content. The other device may be configured to generate, based on the data indicative of the content, the distributed ledger record.

The distributed ledger record may be like the transaction record 500 in FIG. 5. The distributed ledger record may comprise an indication of the content. The indication of the content may be similar to the data 530 in FIG. 5. The distributed ledger record may comprise a smart contract format and the indication of the content may comprise a metadata field of the smart contract format. The indication of the content may comprise an indication of a time that the content was accessed by the one or more user devices. The time may comprise a start time and a stop time. The time may comprise a time period. The indication of the content may comprise an indication of a switch, via the one or more user devices, from a first content channel to a second content channel. The indication of the content may comprise an indication of a percent of the content that was played via the one or more user devices. The indication of the content may comprise an indication of a user action during output, via the one or more user devices, of the content. The user action may comprise at least one of a modification of a volume setting of the one or more user devices, a modification of a power setting of the one or more user devices, a recording of the content, or an execution of a trick play operation via the one or more user devices.

The distributed ledger record may comprise an identifier associated with the one or more user devices. The identifier may be similar to the identification 510 in FIG. 5. The identifier associated with the one or more user devices may comprise a unique identifier assigned to the one or more user devices. The identifier associated with the one or more user devices may comprise a series of letters, numbers, or a combination thereof. The identifier associated with the one or more user devices may comprise an identifier associated with an entity associated with the one or more user devices. The entity may comprise at least one of a user, a household, or a user account associated with the one or more user devices.

The distributed ledger record may comprise a digital signature of one or more of the user devices. The digital signature may be like the digital signature 550 in FIG. 5. One or more of the user devices may have a private key and public key pair. The digital signature may comprise an encryption of at least a portion of the distributed ledger record using the private key or the public key. At least the portion of the distributed ledger record may be decrypted using the other of the private key or the public key. The digital signature may function to verify that the device generated the viewership data 530 or the distributed ledger record.

The distributed ledger record may indicate a transfer of units of a digital currency to an address associated with the distributed ledger. The indication of the transfer of units of digital currency may be similar to the transaction fee 540 in FIG. 5. The address may be associated with another device. The other device may comprise at least one of a router, a set-top device, a tablet, a cellular device, a laptop computer, a desktop computer, or a server.

At step 730, the distributed ledger record may be caused to be stored on a distributed ledger. For example, the user device may cause the distributed ledger record to be stored on the distributed ledger. As another example, the network server may cause the distributed ledger record to be stored on the distributed ledger.

The distributed ledger may be like any of the distributed ledgers 120 in FIG. 1, 200 in FIG. 2, 300 in FIG. 3, or 420 in FIG. 4. However, other distributed ledgers may be used. The distributed ledger may be associated with the content service provider. The distributed ledger may comprise other records indicating content accessed by a plurality of other devices. At least a portion of the other records may be generated by the plurality of other devices. The devices may comprise at least one of a router, a set-top device, a tablet, a cellular device, a laptop computer, a desktop computer, or a server. The other device may comprise memory storing a copy of the distributed ledger. The devices may comprise Ethereum Virtual Machine (EVM) modules. The EVM modules may be configured to update a distributed ledger. The devices may be located at a plurality of premises. The devices may be located at one of the plurality of premises. The devices may be located at others of the plurality of premises.

The distributed ledger may comprise a blockchain. The blockchain may comprise a plurality of blocks. The blockchain may comprise a branch of a larger blockchain. The blockchain may comprise at least one of a public blockchain, a private blockchain, and a permissioned blockchain. Each of the plurality of blocks may comprise at least a portion of the other records. The plurality of blocks may be configured to prevent retroactive modification of the other records. The at least a portion of the other records may comprise blockchain transactions. The distributed ledger record may comprise a blockchain transaction. The causing the distributed ledger record to be stored on the distributed ledger may comprise causing the distributed ledger record to be recorded in one of the plurality of blocks.

The causing the distributed ledger record to be stored on the distributed ledger may comprise establishing, with another of the plurality of other devices, a secure communication protocol. The causing the distributed ledger record to be stored on the distributed ledger may comprise sending, to the other of the plurality of other devices and via the secure communication protocol, the distributed ledger record. The another of the plurality of other devices may be configured to at least one of validate the distributed ledger record, store the distributed ledger record to the distributed ledger, or format the distributed ledger record for the distributed ledger. The other of the plurality of other devices may have greater computing power than the device. The causing the distributed ledger record to be stored on the distributed ledger may comprise sending, to one or more of the plurality of other devices, the distributed ledger record.

The causing the distributed ledger record to be stored on the distributed ledger may comprise one or more of the plurality of other devices validating the distributed ledger record. The validating may comprise validating the distributed ledger record using a consensus method. The consensus method may comprise at least one of a byzantine fault tolerance algorithm, a proof-of-work algorithm, a proof-of-stake algorithm, or a delegated proof of stake algorithm. The validating the distributed ledger record may comprise authenticating the device. The authenticating the device may comprise performing a handshake protocol with a device. At least a portion of the distributed ledger record may be encrypted with a private key associated with the device. The authenticating the device may comprise decrypting the at least a portion of the distributed ledger record using a public key associated with the device. The validating the distributed ledger record may comprise determining that the indication of the content does not contradict data of one or more of the other records of the distributed ledger. The validating the distributed ledger record may comprise determining that the device is authorized to cause the distributed ledger record to be stored on the distributed ledger. The determining that the device is authorized may be based on a database of authorized devices. The database may comprise indications of public keys of the authorized devices. The determining that the device is authorized may be based on decryption of at least a portion of the distributed ledger record using one of the public keys of the authorized devices.

The causing the distributed ledger record to be stored on the distributed ledger may comprise causing the distributed ledger record to be recorded in a distributed ledger block. The distributed ledger block may comprise one or more other records. The causing the distributed ledger record to be stored on the distributed ledger may comprise causing the distributed ledger block to be recorded on the distributed ledger. The causing the distributed ledger block to be recorded on the distributed ledger may comprise sending, to one or more of the plurality of other devices, the distributed ledger block. The causing the distributed ledger block to be stored on the distributed ledger may comprise one or more of the plurality of other devices validating the distributed ledger block. As an example, a user at a house may activate (e.g., turn on, power up, power on, etc.) a first set-top box associated with a service provider. The user may tune the first set-top box to a particular channel (e.g., modify the channel, change the channel, etc.) at a first time. A program executing (e.g., running, etc.) on the first set-top box may record the particular channel and the first time. The user may tune the first set-top box away from the particular channel at a second time. The program executing on the first set-top box may record the second time. The program executing on the first set-top box may determine a movie based on the particular channel, the first time, the second time, and a predetermined schedule (e.g., an electronic programming guide, etc.). The program executing on the first set-top box may determine a percentage of the movie consumed based on the first time, the second time, and the predetermined schedule.

The program executing on the first set-top box may create a transaction comprising the determined movie. The transaction may comprise, as an example, the determined percentage of the movie consumed, an anonymous identifier associated with the first set-top box, an address associated with the service provider, and a transaction fee. The program executing on the first set-top box may encrypt the transaction using a private key. The program executing on the first set-top box may broadcast the transaction to other set-top boxes. A program executing on a second set-top box may decrypt the transaction using a public key. The program executing on the second set-top box may determine that the first set-top box is authorized to add transactions to a blockchain. The program executing on the second set-top box may add the transaction to a block. The program executing on the second set-top box may add the block to the blockchain. The program executing on the first set-top box may cause a value of digital currency indicated by the transaction fee to be transferred to the second set-top box.

Figure 8:
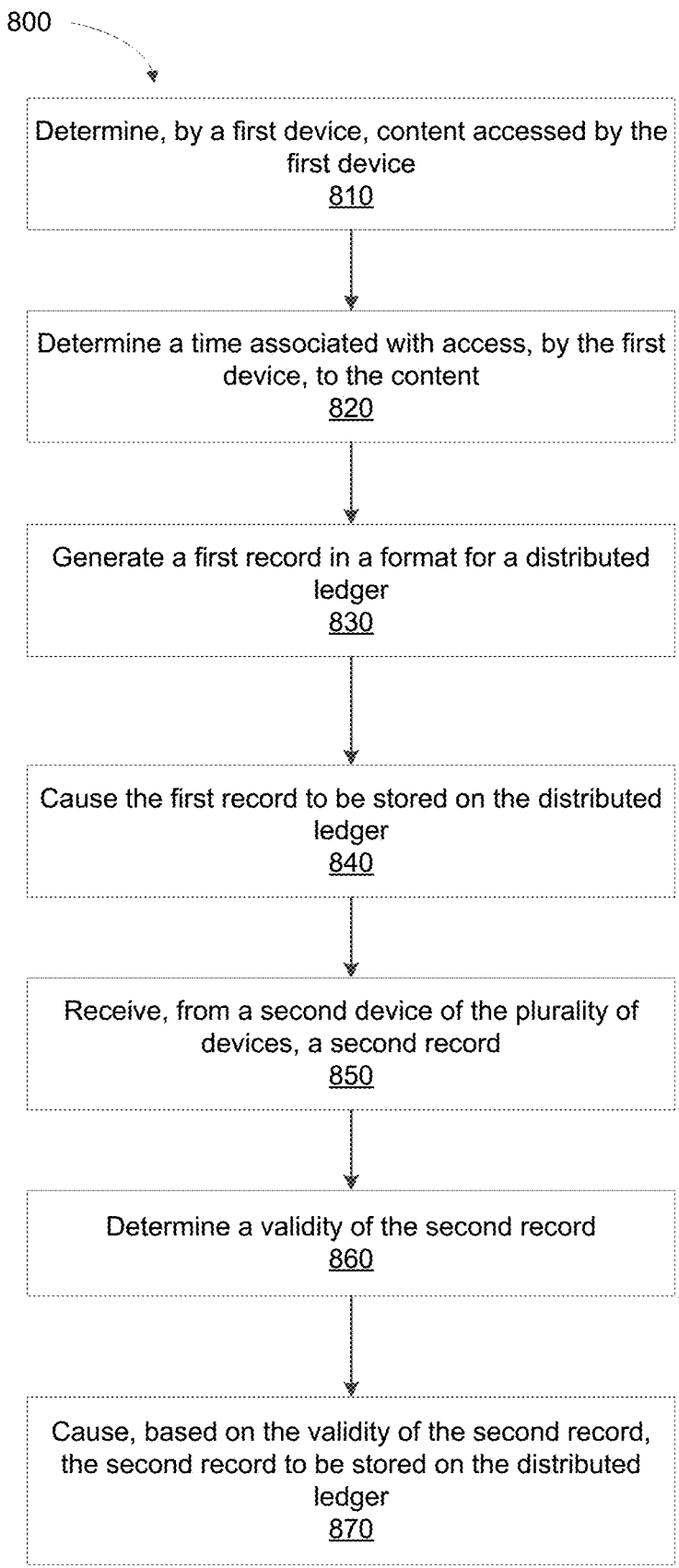
FIG. 8 shows a flow diagram of an example method.

FIG. 8 shows a method 800 for monitoring content consumption. At step 810, content accessed by a first device may be determined. The first device may determine the content accessed by the first device. The first device may comprise at least one of a router, a set-top device, a tablet, a cellular device, a laptop computer, a desktop computer, or a server, as an example. The content may comprise at least one of a television program, a movie, music, an audiobook, a podcast, an electronic book, a game, a channel, or a commercial, as an example.

At step 820, a time associated with access, by the first device, to the content may be determined. The time associated with access to the content may be determined by the first device. The time associated with access to the content may comprise a start time. The time associated with access to the content may comprise an end time. The time associated with access to the content may comprise a time range.

At step 830, a first record may be generated. The first device may generate the first record. The first record may be similar to the transaction record 500 in FIG. 5. The first record may comprise an indication of the content accessed. The first record may comprise an indication of the time associated with the access, by the first device, to the content. The first record may comprise an identifier of the user device. The identifier may be similar to the identification 510 in FIG. 5. The first record may comprise a recipient address. The recipient address may be similar to the recipient address 520 in FIG. 5. The recipient address may comprise an address associated with another user device. The recipient address may comprise an address of a recipient of the first record. The first record may comprise a transaction fee. The transaction fee may be similar to the transaction fee 540 in FIG. 5. The first record may comprise a digital signature. The digital signature may be like the digital signature 550 in FIG. 5.

The first record may be generated in a format for a distributed ledger. The distributed ledger may comprise a plurality of other records indicative of content accessed by one or more of a plurality of devices. The plurality of other records may be stored on the distributed ledger by at least a portion of the plurality of devices. The plurality of other records may be stored on the distributed ledger in an order corresponding to a sequence in which the plurality of other records were stored on the distributed ledger. The distributed ledger may be associated with a service provider.

At step 840, the first record may be caused to be stored on the distributed ledger. The first device may cause the distributed ledger record to be stored on the distributed ledger. Another device may cause the distributed ledger record to be stored on the distributed ledger.

The distributed ledger may be like any of the distributed ledgers 120 in FIG. 1, 200 in FIG. 2, 300 in FIG. 3, or 420 in FIG. 4. The distributed ledger may be associated with the content service provider. The distributed ledger may comprise other records indicating content accessed by a plurality of other devices. At least a portion of the other records may be generated by the plurality of other devices. The devices may comprise at least one of a router, a set-top device, a tablet, a cellular device, a laptop computer, a desktop computer, or a server. The other device may comprise memory storing a copy of the distributed ledger. The devices may comprise Ethereum Virtual Machine (EVM) modules. The EVM modules may be configured to update a distributed ledger. The devices may be located at a plurality of premises. The devices may be located at one of the plurality of premises. The devices may be located at others of the plurality of premises.

The distributed ledger may comprise a blockchain. The blockchain may comprise a plurality of blocks. The blockchain may comprise a branch of a larger blockchain. The blockchain may comprise at least one of a public blockchain, a private blockchain, and a permissioned blockchain. Each of the plurality of blocks may comprise at least a portion of the other records. The plurality of blocks may be configured to prevent retroactive modification of the other records. The at least a portion of the other records may comprise blockchain transactions. The distributed ledger record may comprise a blockchain transaction. The causing the distributed ledger record to be stored on the distributed ledger may comprise causing the distributed ledger record to be recorded in one of the plurality of blocks.

The causing the distributed ledger record to be stored on the distributed ledger may comprise establishing, with another of the plurality of other devices, a secure communication protocol. The causing the distributed ledger record to be stored on the distributed ledger may comprise sending, to the other of the plurality of other devices and via the secure communication protocol, the distributed ledger record. The another of the plurality of other devices may be configured to at least one of validate the distributed ledger record, store the distributed ledger record to the distributed ledger, or format the distributed ledger record for the distributed ledger. The other of the plurality of other devices may have greater computing power than the device. The causing the distributed ledger record to be stored on the distributed ledger may comprise sending, to one or more of the plurality of other devices, the distributed ledger record.

The causing the distributed ledger record to be stored on the distributed ledger may comprise one or more of the plurality of other devices validating the distributed ledger record. The validating may comprise validating the distributed ledger record using a consensus method. The consensus method may comprise at least one of a byzantine fault tolerance algorithm, a proof-of-work algorithm, a proof-of-stake algorithm, or a delegated proof of stake algorithm. The validating the distributed ledger record may comprise authenticating the device. The authenticating the device may comprise performing a handshake protocol with a device. At least a portion of the distributed ledger record may be encrypted with a private key associated with the first device. The authenticating the device may comprise decrypting the at least a portion of the distributed ledger record using a public key associated with the first device. The validating the distributed ledger record may comprise determining that the indication of the content does not contradict data of one or more of the other records of the distributed ledger. The validating the distributed ledger record may comprise determining that the first device is authorized to cause the distributed ledger record to be stored on the distributed ledger. The determining that the first device is authorized may be based on a database of authorized devices. The database may comprise indications of public keys of the authorized devices. The determining that the first device is authorized may be based on decryption of at least a portion of the distributed ledger record using one of the public keys of the authorized devices.

The causing the distributed ledger record to be stored on the distributed ledger may comprise causing the distributed ledger record to be recorded in a distributed ledger block. The distributed ledger block may comprise one or more other records. The causing the distributed ledger record to be stored on the distributed ledger may comprise causing the distributed ledger block to be recorded on the distributed ledger. The causing the distributed ledger block to be recorded on the distributed ledger may comprise sending, to one or more of the plurality of other devices, the distributed ledger block. The causing the distributed ledger block to be stored on the distributed ledger may comprise one or more of the plurality of other devices validating the distributed ledger block.

At step 850, a second record may be received from a second device of the plurality of devices. The second device may be similar to the first device. The second device may comprise at least one of a router, a set-top device, a tablet, a cellular device, a laptop computer, a desktop computer, or a server, as an example. The first device may receive the second record. The second record may be similar to the first record. The second record may be similar to the transaction record 500 in FIG. 5. The second record may comprise an indication of content accessed by the second device. The second record may comprise an identifier of the second device. The second record may comprise a second transaction fee. The second transaction fee may be equal to the transaction fee of the first record. The second record transaction fee may comprise units of a digital currency.

At step 860, a validity of the second record may be determined. The first device may determine the validity of the second record. The determining the validity of the second record may comprise determining one or more records of the plurality of other records of the distributed ledger that are associated with the second device. The determining the validity of the second record may comprise determining that the second record does not indicate information in conflict with information of the one or more records associated with the second device.

The determining the validity of the second record may comprise determining that the second device is authorized to update the distributed ledger. The determining that the second device is authorized may comprise determining that the second device is associated with a service provider account. The determining that the second device is associated with the service provider account may comprise determining that a database of identifiers of devices associated with the service provider comprises an indication of the identifier of the second device. The determining that the second device is associated with the service provider account may comprise decrypting, using a public key associated with the service provider account, at least a portion of the second record.

At step 870, the second record may be caused to be stored on the distributed ledger based on the validity of the second record. The first device may cause, based on the validity of the second record, the second record to be stored on the distributed ledger.

As an example, a user at a house may activate (e.g., turn on, power up, power on, etc.) a first set-top box associated with a service provider. The user may tune the first set-top box to a particular channel (e.g., modify the channel, change the channel, etc.) at a first time. A program executing (e.g., running, etc.) on the first set-top box may record the particular channel and the first time. The user may tune the first set-top box away from the particular channel at a second time. The program executing on the first set-top box may record the second time. The program executing on the first set-top box may determine a television show based on the particular channel, the first time, the second time, and a predetermined schedule (e.g., an electronic programming guide, etc.). The program executing on the first set-top box may determine a percentage of the television show consumed based on the first time, the second time, and the predetermined schedule.

The program executing on the first set-top box may create a transaction comprising the determined television show, the determined percentage of the television show consumed, an anonymous identifier associated with the first set-top box, an address associated with the service provider, and a transaction fee. The program executing on the first set-top box may encrypt the transaction using a private key. The program executing on the first set-top box may broadcast the transaction to other set-top boxes. A program executing on a second set-top box may decrypt the transaction using a public key. The program executing on the second set-top box may determine that the first set-top box is authorized to add transactions to a blockchain. The program executing on the second set-top box may add the transaction to a block. The program executing on the second set-top box may add the block to the blockchain. The program executing on the first set-top box may cause a value of digital currency indicated by the transaction fee to be transferred to the second set-top box.

Figure 9:
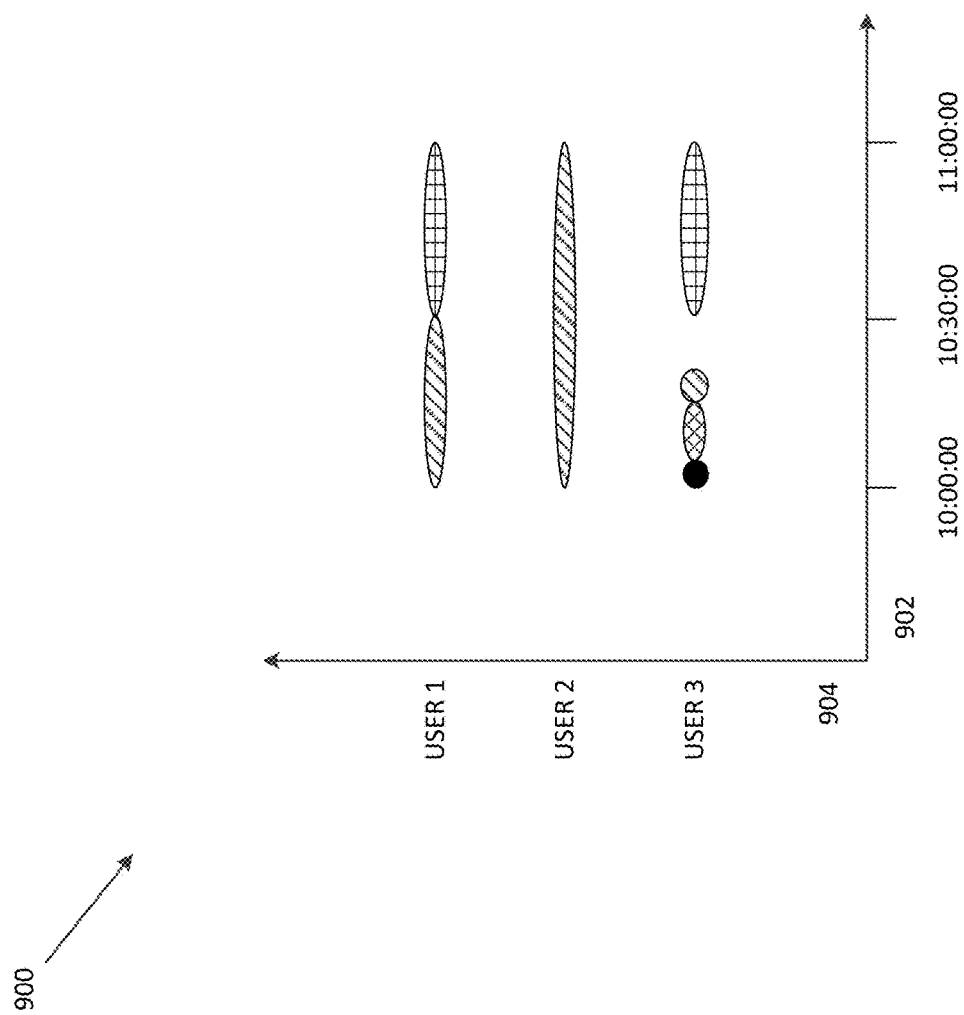
FIG. 9 shows a graph to visualize data stored in a blockchain.

FIG. 9 shows a graph 900 to visualize data associated with content consumption. The data may be extrapolated from a distributed ledger comprising content consumption records. For example, a device associated with a service provider, such as the universal recipient 610 in FIG. 6, may extrapolate the data from the distributed ledger. The horizontal axis 902 shows times that content assets were consumed. The vertical axis 904 shows users. The users may comprise user devices, customers of the service provider, households, or service provider accounts, for example.

Graph 900 comprises bubbles that represent content that was consumed by the corresponding user on axis 904. The time spanned by the bubbles represents the time that the content was accessed by the corresponding user. The patterns of the bubbles represent content. For example, the shaded bubble corresponding to user 3 represents first content, the latticed bubble corresponding to user 3 represents second content, and the striped bubble corresponding to user 3 represents third content. The graph indicates that user 3 consumed the first content between the times of 10:00:00 and 10:05:00 (e.g., a.m. or p.m.). The graph indicates that user 3 consumed the second content between the times of 10:05:00 and 10:15:00. The graph indicates that user 3 consumed the third content between the times of 10:15:00 and 10:20:00, approximately.

Figure 10:
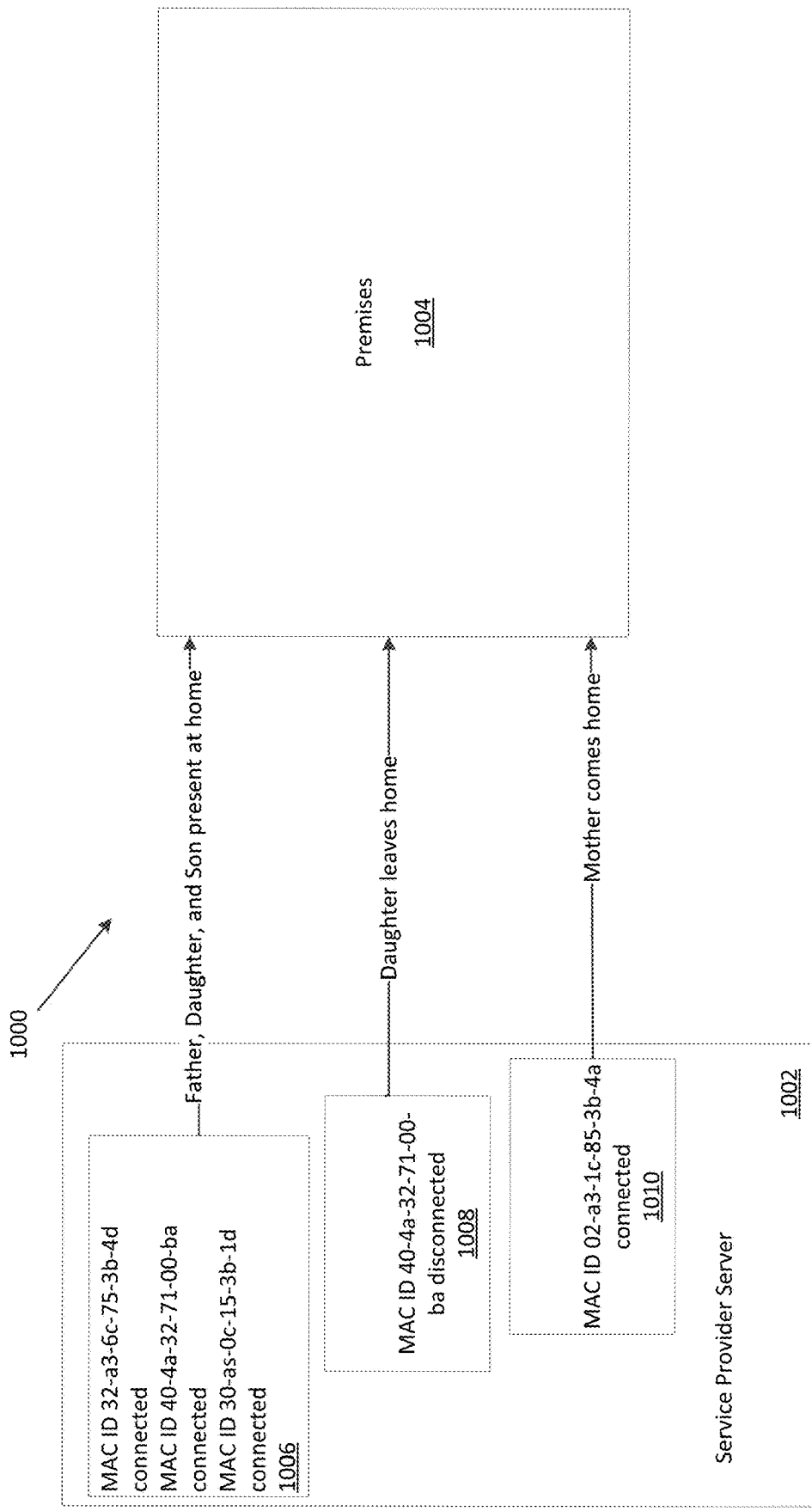
FIG. 10 shows an example custom advertisement system.

The data shown in graph 900 may be used to determine the popularity of content. The data may be used to determine consumption ratings for the content. The consumption ratings may indicate viewing habits, such as viewing habits of the users. The viewing habits of the users may be used to determine targeted content for the users. FIG. 10 shows an example custom advertisement system 1000. The system 1000 may comprise a service provider server 1002 and a premises 1004. The service provider server 1002 may cause advertisements to be delivered to the premises 1004 based on detected states 1006, 1008, 1010. The service provider server 1002 may detect the states 1006, 1008, 1010. The service provider server 1002 may receive an indication of the states 1006, 1008, 1010 from the premises 1004.

At a first state 1006, three media access control address identifiers (MAC IDs) may be detected at the premises 1004. One detected MAC ID may be associated with a mobile device associated with a forty-something year old father. One detected MAC ID may be associated with a mobile device associated with a teen daughter. One detected MAC ID may be associated with a mobile device associated with a teen son. At the first state 1006, advertisements aimed at teens may be delivered to the premises 1004 based on the detected MAC IDs. At the first state 1006, advertisements aimed at teens may be delivered to the premises 1004 at a rate of two to one to advertisements aimed at adults based on the detected MAC IDs.

At a second state 1008, the MAC ID associated with the mobile device associated with the daughter may no longer be detected at the premises 1004. At the second state 1008, advertisements aimed at males of all ages may be delivered to the premises 1004 based on the detected MAC IDs. At the second state 1008, advertisements aimed at males between the ages of 15-45 may be delivered to the premises 1004 based on the detected MAC IDs. At the second state 1008, advertisements aimed at male teens may be delivered to the premises 1004 at a rate the same or similar to a rate that advertisements aimed at male adults are delivered to the premises 1004 based on the detected MAC IDs.

At a third state 1010, a MAC ID associated with a mobile device associated with a forty-something year old mother may be detected at the premises 1004. At the third state 1010, advertisements aimed at adults may be delivered to the premises 1004 based on the detected MAC IDs. At the third state 1010, advertisements aimed at adults may be delivered to the premises 1004 at a rate of two to one to advertisements aimed at teens based on the detected MAC IDs.

Figure 11:
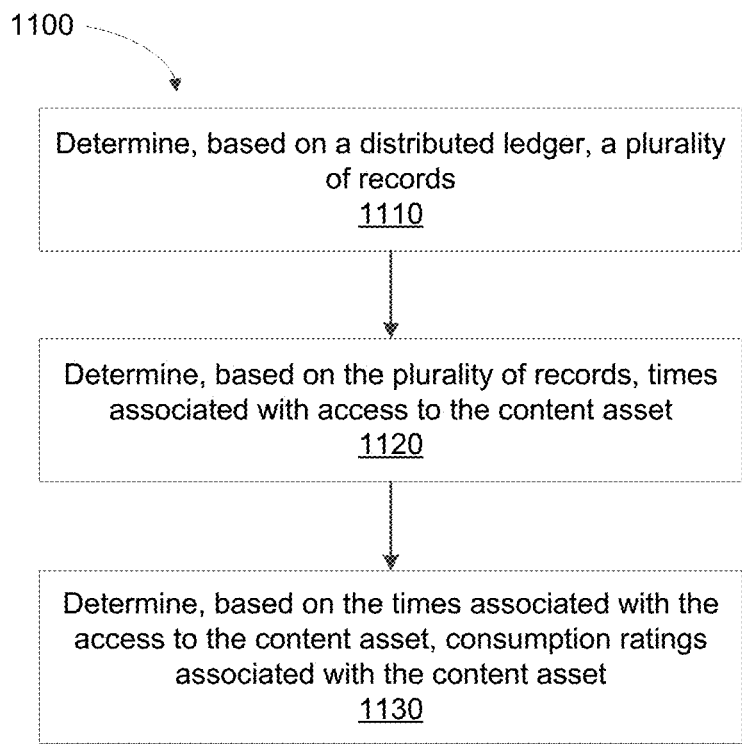
FIG. 11 shows a flow diagram of an example method.

FIG. 11 shows a method 1100 for monitoring content consumption. At step 1110, a plurality of records may be determined based on a distributed ledger. The plurality of records may be determined by a computing device. The computing device may be similar to the user devices 410 or the server 450 in FIG. 4. The computing device may be similar to the universal recipient 610 in FIG. 6. Each of the plurality of records may be indicative of a content asset accessed by one or more of a plurality of devices. The content asset may comprise video content, audio content, interactive content, pre-recorded content, or live streaming content, for example. The content asset may comprise a television program, a movie, music, an audiobook, a podcast, an electronic book, a game, a channel, or a commercial, for example. The plurality of devices may comprise user devices (e.g., user devices 410 in FIG. 4). The plurality of devices may comprise at least one of a router, a set-top device, a tablet, a cellular device, a laptop computer, a desktop computer, or a server.

The plurality of records may be stored on the distributed ledger by at least a portion of the plurality of devices. The plurality of records may comprise records of content accessed, such as by one or more of the plurality of devices. The plurality of records may comprise identifiers associated with the plurality of devices. Accounts associated with the plurality of devices may be determined based on the identifiers and a database. The database may comprise the identifiers mapped to the accounts. The plurality of devices may be determined to be associated with accounts associated with a content service based on the database. The database may comprise identifiers associated with the accounts mapped to the identifiers associated with the plurality of devices. The database may be isolated to a storage medium accessible by the computing device. The identifiers associated with the plurality of devices may comprise public keys associated with the plurality of devices. The identifiers associated with the accounts may comprise private keys associated with the plurality of devices. The identifiers associated with the accounts may comprise identifications of users associated with the accounts. The identifiers associated with the plurality of devices may be encrypted using a public key associated with the computing device. The identifiers associated with the plurality of devices may be decrypted using a private key associated with the computing device.

At step 1120, times associated with access to the content asset may be determined based on the plurality of records. The records may comprise indications of content assets accessed. The indications of the content assets accessed may comprise indications of times that the content assets were accessed. Records comprising an indication of the content asset may be determined. Based on the determined records, the times associated with access to the content asset may be determined based on the indications of the times that the content asset was accessed. At step 1130, consumption ratings associated with the content asset may be determined based on the times associated with the access to the content asset. The consumption ratings may comprise statistical data. The statistical data may indicate consumption, such as viewership of or access to, the content asset with respect to time. The consumption of the content asset may comprise periods of time that the content asset was consumed. The consumption of the content asset may comprise user actions performed during viewing of or access to the content asset. The user actions may comprise at least one of a modification of a volume setting of one or more of the plurality of devices, a modification of a power setting of one or more of the plurality of devices, a recording of the content asset, or an execution of a trick play operation via one or more of the plurality of devices.

The statistical data may comprise trends in viewership of the content asset. The statistical data may comprise viewership of the content asset compared to viewership of one or more other content assets. The viewership data may comprise consumption ratings associated with the content asset.

The viewership of the content asset with respect to time may be with respect to at least one of one or more service provider accounts, one or more users, one or more households, or one or more of the plurality of devices. The viewership of the content asset may comprise a total number of the at least one of the one or more service provider accounts, the one or more users, the one or more households, or the one or more of the plurality of devices that accessed the content asset.

Demographics of users associated with one or more of the plurality of devices may be determined based on viewership data. Targeted content for the users may be determined based on the demographics of the users. Viewership data associated with the demographics of the users may be determined based on the viewership data and demographics of users associated with one or more of the plurality of devices. Targeted content for the users may be determined based on the determined viewership data associated with the demographics of the users. The viewership data may be associated with at least one of the plurality of devices. Targeted content may be determined for the at least one of the plurality of devices based on the viewership data.

Figure 12:
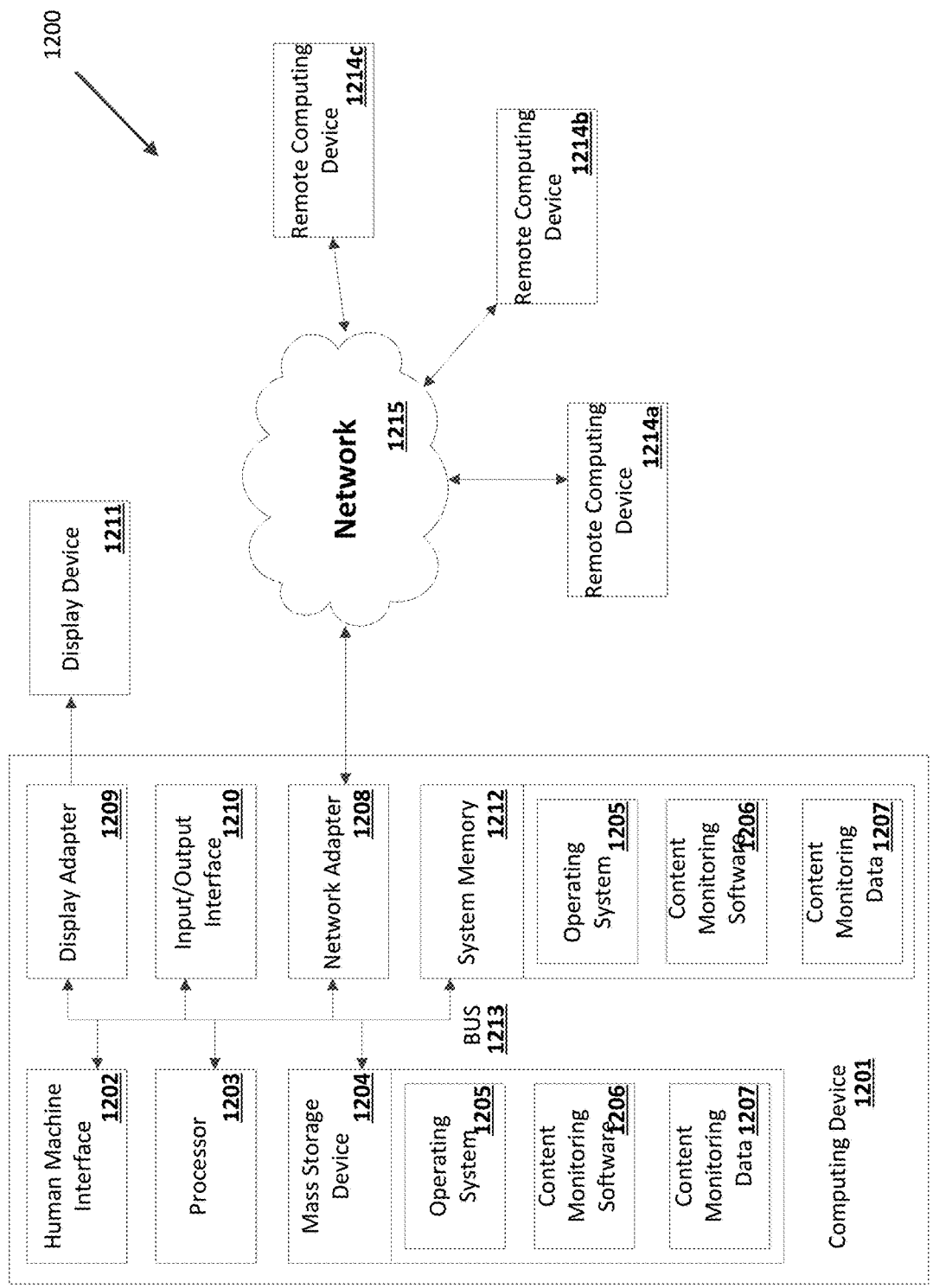
FIG. 12 shows an example computing environment.

The targeted content may be caused to be output via the one or more of the plurality of devices. The causing output of the determined targeted content may comprise determining that the at least one of the plurality of devices is connected to a network. The causing output of the determined targeted content may comprise transmitting, based at least on the determining that the at least one of the plurality of devices is connected to the network and to the at least one of the plurality of devices, the determined targeted content via the network. The causing output of the determined targeted content may comprise determining that the at least one of the plurality of devices is present at a premises. The causing output of the determined targeted content may comprise causing output, based at least on the determining that the at least one of the plurality of devices is present at the premises, via the at least one of the plurality of devices. The determining that the at least one of the plurality of devices is present at the premises may comprise determining, using a media access control (MAC) address of the at least one of the plurality of devices, that the at least one of the plurality of devices is present at the premises. Areas of a premises at which one or more of the plurality of devices are located may be determined based on the content consumption data. Targeted content for the determined areas may be determined based on the content consumption data. Targeted content for the determined areas may be caused to be outputted via the one or more of the plurality of devices determined to be in the determined areas. FIG. 12 shows a block diagram illustrating an exemplary operating environment 1200 for performing the disclosed methods of monitoring content consumption. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media, including memory storage devices.

Further, one skilled in the art will appreciate that the systems and methods disclosed herein may be implemented via a general-purpose computing device in the form of a computing device 1201. The components of the computing device 1201 may comprise, but are not limited to, one or more processors or processing units 1203, a system memory 1212, and a system bus 1213 that couples various system components including the processor 1203 to the system memory 1212. In the case of multiple processing units 1203, the system may utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like.

The bus 1213, and all buses specified in this description may also be implemented over a wired or wireless network connection and each of the subsystems, including the processor 1203, a mass storage device 1204, an operating system 1205, content monitoring software 1206, content monitoring data 1207, a network adapter 1208, system memory 1212, an Input/Output Interface 1210, a display adapter 1209, a display device 1211, and a human machine interface 1202, may be contained within one or more remote computing devices 1214a,b,c at physically separate locations, connected through buses of this form, in effect implementing a fully distributed system.

The computing device 1201 typically comprises a variety of computer readable media. Exemplary readable media may be any available media that is accessible by the computing device 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data, such as content monitoring data 1207, and/or program modules, such as operating system 1205 and content monitoring software 1206, that are immediately accessible to and/or are presently operated on by the processing unit 1203.

In another aspect, the computing device 1201 may also comprise other removable/non-removable, volatile/non-volatile computer storage media. By way of example, FIG. 12 illustrates a mass storage device 1204, which may provide non-volatile storage of computer code, computer readable instructions, data structures, program modules, and other data for the computing device 1201. For example and not meant to be limiting, a mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1204, including, by way of example, an operating system 1205 and content monitoring software 1206. Each of the operating system 1205 and content monitoring software 1206 (or some combination thereof) may comprise elements of the programming and the content monitoring software 1206. Content monitoring data 1207 may also be stored on the mass storage device 1204. Content monitoring data 1207 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, a user may enter commands and information into the computing device 1201 via an input device (not shown). Examples of such input devices comprise, but are not limited to, a keyboard, a pointing device (e.g., a "mouse"), a microphone, a joystick, a scanner, tactile input devices such as gloves, and other body coverings, and the like. These and other input devices may be connected to the processing unit 1203 via a human machine interface 1202 that is coupled to the system bus 1213, but may be connected by other interface and bus structures, such as a parallel port, game port, an IEEE 1294 Port (also known as a Firewire port), a serial port, or a universal serial bus (USB).

In yet another aspect, a display device 1211 may also be connected to the system bus 1213 via an interface, such as a display adapter 1209. It is contemplated that the computing device 1201 may have more than one display adapter 1209 and the computing device 1201 may have more than one display device 1211. For example, a display device may be a monitor, an LCD (Liquid Crystal Display), or a projector. In addition to the display device 1211, other output peripheral devices may comprise components, such as speakers (not shown) and a printer (not shown), which may be connected to the computing device 1201 via Input/Output Interface 1210. Any step and/or result of the methods may be output in any form to an output device. Such output may be any form of visual representation, including, but not limited to, textual, graphical, animation, audio, tactile, and the like. The display 1211 and computing device 1201 may be part of one device, or separate devices.

The computing device 1201 may operate in a networked environment using logical connections to one or more remote computing devices 1214a,b,c. By way of example, a remote computing device may be a personal computer, portable computer, a smart phone, a server, a router, a network computer, a peer device or other common network node, and so on. Logical connections between the computing device 1201 and a remote computing device 1214a,b,c may be made via a network 1215, such as a local area network (LAN) and a general wide area network (WAN). Such network connections may be through a network adapter 1208. A network adapter 1208 may be implemented in both wired and wireless environments. Such networking environments are conventional and commonplace in dwellings, offices, enterprise-wide computer networks, intranets, and the Internet.

For purposes of illustration, application programs and other executable program components, such as the operating system 1205 are illustrated herein as discrete blocks, although it is recognized that such programs and components reside at various times in different storage components of the computing device 1201, and are executed by the data processor(s) 1203 of the computing device 1201. An implementation of content monitoring software 1206 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   determining, from a distributed ledger associated with a plurality of records, a record, wherein the record is one of the plurality of records, wherein the record indicates a content asset accessed by a device of a plurality of devices,
wherein the record comprises an identifier associated with a user of the device,
wherein the identifier is configured to uniquely identify the user while maintaining the user's anonymity,
wherein the identifier is available to at least a portion of the plurality of devices, and the user associated with the identifier is anonymous to the at least a portion of the plurality of devices,
wherein the record is signed with a digital signature associated with the device, and
wherein the digital signature is capable of being decrypted using a key;
retrieving, based on the identifier and from a demographic information source, demographic information associated with the user; and
associating the demographic information with the record.

2. The method of claim 1, further comprising:
identifying, based on the associating the demographic information with the record, a second content asset; and
sending the second content asset to the user.

3. The method of claim 1, further comprising:
determining, from at least the demographic information, viewership data associated with the content asset.

4. The method of claim 3, further comprising:
identifying, from the viewership data, a second content asset;
determining, from at least the demographic information, a second user; and
sending the second content asset to the second user.

5. The method of claim 1, further comprising:
determining, based at least in part on the plurality of records, a pattern of access to the content asset; and
determining, based on the pattern of access to the content asset, second demographic information associated with the content asset, wherein the second demographic information is associated with the at least the portion of the of the plurality of devices.

6. The method of claim 5, further comprising:
determining, based at least in part on the second demographic information, a consumption rating for the content asset.

7. The method of claim 1, further comprising:
determining, based at least in part on the plurality of records, consumption information associated with the content asset; and
associating the consumption information with demographic information associated with the at least the portion of the plurality of devices.

8. The method of claim 1, wherein the demographic information comprises at least one of age, gender, race, national origin, marital status, religion, or pet ownership status.

9. A system comprising:
a device configured to:
determine, from a distributed ledger associated with a plurality of records, a record, wherein the record is one of the plurality of records,
wherein the record indicates a content asset accessed by a device of a plurality of devices,
wherein the record comprises an identifier associated with a user of the device,
wherein the identifier is configured to uniquely identify the user while maintaining the user's anonymity,
wherein the identifier is available to at least a portion of the plurality of devices, and the user associated with the identifier is anonymous to the at least a portion of the plurality of devices,
wherein the record is signed with a digital signature associated with the device, and
wherein the digital signature is capable of being decrypted using a key;
retrieve, based on the identifier and a demographic information source, demographic information associated with the user; and
associate the demographic information with the record; and
a database configured to store the demographic information, wherein the device is configured to retrieve the demographic information from the database.

10. The system of claim 9, wherein the device is further configured to:
identify, based on the associating the demographic information with the record, a second content asset; and
send the second content asset to the user.

11. The system of claim 9, wherein the device is further configured to:
determine, from at least the demographic information, viewership data associated with the content asset.

12. The system of claim 9, wherein the device is further configured to:
identify, from the viewership data, a second content asset;
determine, from at least the demographic information, a second user; and
send the second content asset to the second user.

13. The system of claim 9, wherein the device is further configured to:
determine, based at least in part on the plurality of records, a pattern of access to the content asset;
determine, based on the pattern of access to the content asset, second demographic information associated with the content asset, wherein the second demographic information is associated with the at least the portion of the of the plurality of devices.

14. The system of claim 13, wherein the device is further configured to:
determine, based at least in part on the second demographic information, a consumption rating for the content asset.

15. A device configured to:
determine, from a distributed ledger associated with a plurality of records, a record, wherein the record is one of the plurality of records,
wherein the record indicates a content asset accessed by a device of a plurality of devices,
wherein the record comprises an identifier associated with a user of the device,
wherein the identifier is configured to uniquely identify the user while maintaining the user's anonymity,
wherein the identifier is available to at least a portion of the plurality of devices, and the user associated with the identifier is anonymous to the at least a portion of the plurality of devices,
wherein the record is signed with a digital signature associated with the device, and
wherein the digital signature is capable of being decrypted using a key;
retrieve, based on the identifier and from a demographic information source, demographic information associated with the user; and
associate the demographic information with the record.

16. The device of claim 15, further configured to:
identify, based on the associating the demographic information with the record, a second content asset; and
send the second content asset to the user.

17. The device of claim 15, further configured to:
determine, from at least the demographic information, viewership data associated with the content asset.

18. The device of claim 15, further configured to:
identify, from the viewership data, a second content asset;
determine, from at least the demographic information, a second user; and
send the second content asset to the second user.

19. The device of claim 15, further configured to:
determine, based at least in part on the plurality of records, a pattern of access to the content asset;
determine, based on the pattern of access to the content asset, second demographic information associated with the content asset, wherein the second demographic information is associated with the at least the portion of the of the plurality of devices.

20. The device of claim 19, further configured to:
determine, based at least in part on the second demographic information, a consumption rating for the content asset.

* * * * *